(12) United States Patent
Hirabayashi

(10) Patent No.: US 10,484,725 B2
(45) Date of Patent: Nov. 19, 2019

(54) INFORMATION PROCESSING APPARATUS AND INFORMATION PROCESSING METHOD FOR REPRODUCING MEDIA BASED ON EDIT FILE

(71) Applicant: SONY CORPORATION, Tokyo (JP)

(72) Inventor: Mitsuhiro Hirabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/510,851

(22) PCT Filed: Sep. 14, 2015

(86) PCT No.: PCT/JP2015/075949
§ 371 (c)(1),
(2) Date: Mar. 13, 2017

(87) PCT Pub. No.: WO2016/047475
PCT Pub. Date: Mar. 31, 2016

(65) Prior Publication Data
US 2017/0289585 A1 Oct. 5, 2017

(30) Foreign Application Priority Data
Sep. 26, 2014 (JP) ................................. 2014-197017

(51) Int. Cl.
*H04N 21/2343* (2011.01)
*H04N 21/236* (2011.01)
(Continued)

(52) U.S. Cl.
CPC ....... *H04N 21/2343* (2013.01); *H04N 21/236* (2013.01); *H04N 21/238* (2013.01);
(Continued)

(58) Field of Classification Search
CPC ........... H04N 21/2343; H04N 21/6125; H04N 21/236; H04N 21/4345; H04N 21/26283;
(Continued)

(56) References Cited

U.S. PATENT DOCUMENTS 8,898,717 B1* 11/2014 Labrozzi .............. H04N 21/222
725/114
2003/0133695 A1* 7/2003 Hirabayashi ......... G11B 27/034
386/241
(Continued)

FOREIGN PATENT DOCUMENTS

| CA | 2774923 A1 | 3/2011 |
| CA | 2854008 A1 | 3/2011 |

(Continued)

OTHER PUBLICATIONS

"Text of ISO/IEC 23009-1:2012 DAM 1 Support for Event Messages and Extended Audio Channel Configuration", Coding of Moving Pictures and Audio, ISO/IEC JTC1/SC29/WG11, MPEG2012/W13080, Shanghai, China, Nov. 2012, 42 pages.

(Continued)

*Primary Examiner* — Cynthia M Fogg
(74) *Attorney, Agent, or Firm* — Chip Law Group

(57) ABSTRACT

The present disclosure relates to an information processing apparatus and an information processing method that are capable of reproducing content on the basis of an edit list in the case where the reproduction start time of content contained in a file in the MP4 Fragmented Movie format is later than the reproduction start time in a movie time scale. An edit list generation unit registers a top position of content as a reproduction start position of the content and a predetermined value as a reproduction time duration of the content in an edit list when a reproduction start time of the content is later than a reproduction start time of the content on a movie time scale, the edit list associating the reproduction (Continued)

start position of the content with the reproduction time duration of the content reproduced from the reproduction start position. The present disclosure is applicable to a file generation apparatus that generates a Fragmented MP4 file, for example.

10 Claims, 26 Drawing Sheets

(51) Int. Cl.
  *H04N 21/238* (2011.01)
  *H04N 21/8547* (2011.01)
  *H04N 21/262* (2011.01)
  *H04N 21/434* (2011.01)
  *H04N 21/61* (2011.01)
  *H04N 21/854* (2011.01)

(52) U.S. Cl.
  CPC ... *H04N 21/26283* (2013.01); *H04N 21/4345* (2013.01); *H04N 21/6125* (2013.01); *H04N 21/6175* (2013.01); *H04N 21/854* (2013.01); *H04N 21/8547* (2013.01)

(58) Field of Classification Search
  CPC ............. H04N 21/6175; H04N 21/854; H04N 21/8456; H04N 21/23439; H04N 21/26258; H04N 21/44209; H04N 21/234; H04N 21/2662; H04N 21/234363; H04N 21/85406; H04N 21/6373; H04N 21/2365
  USPC ........................................................ 725/116
  See application file for complete search history.

(56) References Cited

U.S. PATENT DOCUMENTS

| | | | |
|---|---|---|---|
| 2004/0088310 A1* | 5/2004 | Sugimura | G11B 27/329 |
| 2007/0150919 A1* | 6/2007 | Morishita | H04N 21/235 |
| | | | 725/35 |
| 2008/0250047 A1* | 10/2008 | Hannuksela | G11B 27/3027 |
| 2008/0256431 A1 | 10/2008 | Hornberger | |
| 2008/0303832 A1* | 12/2008 | Kim | G09G 3/003 |
| | | | 345/501 |
| 2011/0238789 A1* | 9/2011 | Luby | H04N 21/23106 |
| | | | 709/219 |
| 2012/0233345 A1 | 9/2012 | Hannuksela | |
| 2013/0170561 A1* | 7/2013 | Hannuksela | H04N 21/23424 |
| | | | 375/240.25 |
| 2014/0195651 A1* | 7/2014 | Stockhammer | H04N 21/23439 |
| | | | 709/219 |
| 2016/0323342 A1 | 11/2016 | Luby et al. | |

FOREIGN PATENT DOCUMENTS

| | | |
|---|---|---|
| CA | 2854011 A1 | 3/2011 |
| CA | 2854017 A1 | 3/2011 |
| CN | 102577411 A | 7/2012 |
| EP | 2481197 A2 | 8/2012 |
| JP | 2007-243907 A | 9/2007 |
| JP | 2008-252590 A | 10/2008 |
| JP | 2010-124395 A | 6/2010 |
| JP | 2010-193209 A | 9/2010 |
| JP | 2011-528868 A | 11/2011 |
| JP | 2012-175608 A | 9/2012 |
| JP | 2013-505680 A | 2/2013 |
| JP | 2013-115439 A | 6/2013 |
| JP | 5666598 B2 | 2/2015 |
| JP | 2015-053677 A | 3/2015 |
| JP | 5911926 B2 | 4/2016 |
| JP | 2016-174363 A | 9/2016 |
| JP | 6254208 B2 | 12/2017 |
| KR | 10-2012-0080208 A | 7/2012 |
| KR | 10-2014-0004262 A | 1/2014 |
| KR | 10-2014-0069368 A | 6/2014 |
| KR | 10-2014-0069369 A | 6/2014 |
| MY | 163822 A | 10/2017 |
| RU | 2012116086 A | 10/2013 |
| WO | 2011/038013 A2 | 3/2011 |
| ZA | 201202935 B | 12/2012 |

OTHER PUBLICATIONS

Extended European Search Report of EP Application No. 15844731.8, dated Feb. 20, 2018, 08 pages of EESR.

Office Action for JP Patent Application No. 2016-550108, dated Jun. 25, 2019, 07 pages of Office Action and 07 pages of English Translation.

"Information Technology—Coding of Audio-Visual Objects—Part 12: ISO Base Media File Format", ISO/IEC JTC 1/ SC 29 Coding of audio, picture, multimedia and hypermedia information, Sep. 15, 2012, 08 pages.

Office Action for CN Patent Application No. 201580049545.4, dated Jun. 12, 2019, 05 pages of Office Action and 7 pages of English Translation.

* cited by examiner

| Segment Duration | Media Time | Media Rate |
|---|---|---|
| 90000 (1sec) | -1 (Empty) | 1.0 |
| 180000 (2sec) | 0 (0sec) | 1.0 |
| 90000 (1sec) | 90000 (3sec) | 1.0 |

| Segment Duration | Media Time | Media Rate |
|---|---|---|
| 900000(10sec) | 3000 | 1.0 |

FIG. 9B

| Segment Duration | Media Time | Media Rate |
|---|---|---|
| 0 | 3000 | 1.0 |

| Segment Duration | Media Time | Media Rate |
|---|---|---|
| 9000 | -1 | 1.0 |
| Tx | 0 | 1.0 |

FIG.11

| Segment Duration | Media Time | Media Rate |
|---|---|---|
| 90000 | -1 | 1.0 |
| 0 | 0 | 1.0 |

FIG.13

| Segment Duration | Media Time | Media Rate |
|---|---|---|
| 9000 | -1 | 1.0 |
| 0xFFFFFFFF | 0 | 1.0 |

FIG.15

INFORMATION PROCESSING APPARATUS AND INFORMATION PROCESSING METHOD FOR REPRODUCING MEDIA BASED ON EDIT FILE

CROSS REFERENCE TO RELATED APPLICATIONS

This application is a U.S. National Phase of International Patent Application No. PCT/JP2015/075949 filed on Sep. 14, 2015, which claims priority benefit of Japanese Patent Application No. JP 2014-197017 filed in the Japan Patent Office on Sep. 26, 2014. Each of the above-referenced applications is hereby incorporated herein by reference in its entirety.

TECHNICAL FIELD

The present disclosure relates to an information processing apparatus and an information processing method, and particularly to an information processing apparatus and an information processing method that are capable of reproducing content on the basis of an edit list in the case where the reproduction start time of content contained in a file in the MP4 Fragmented Movie format is later than the reproduction start time in a movie time scale.

BACKGROUND ART

The mainstream of streaming service on the Internet has becoming an OTT-V (Over The Top Video). MPEG-DASH (Moving Picture Experts Group phase-Dynamic Adaptive Streaming over HTTP) begins to be widely used as the fundamental technology (see, for example, Non-Patent Literature 1).

In the MPEG-DASH, a delivery server prepares a group of encoded streams having different screen sizes and encoding rates for one movie content and a reproduction terminal requests the encoded stream having the optimal screen size and the optimal encoding rate depending on the state of the transmission path, thereby achieving adaptive streaming delivery.

In the MPEG-DASH, the encoded stream is stored in a file in the MP4 Fragmented Movie format. Further, a moov box of a file in the MP4 Fragmented Movie format includes no corresponding mdat box, and the edit list of the encoded stream put in the mdat box managed by the moof box is described in the moov box. The edit list is a list obtained by associating the reproduction start position of the encoded stream of content contained in the movie content with the reproduction time duration of the encoded stream reproduced from the reproduction start position in the order of reproduction.

CITATION LIST

Non-Patent Literature

Non-Patent Literature 1: MPEG-DASH(Dynamic Adaptive Streaming over HTTP) (URL: http://mpeg.chiariglione.org/standards/mpeg-dash/media-presentation-description-and-segment-formats/text-isoiec-23009-12012-dam-1)

DISCLOSURE OF INVENTION

Technical Problem

However, when a moov box of a file in the MP4 Fragmented Movie format is generated, it is difficult to recognize the reproduction time duration of the encoded stream put in the mdat box managed by the moof box thereafter in some cases. In this case, it is difficult to generate an edit list, and the reproduction apparatus cannot reproduce the movie content on the basis of the edit list.

The present disclosure has been made in view of the above circumstances to be able to reproduce content on the basis of an edit list in the case where the reproduction start time of content contained in a file in the MP4 Fragmented Movie format is later than the reproduction start time in a movie time scale.

Solution to Problem

An information processing apparatus according to a first aspect of the present disclosure is an information processing apparatus including: an edit list generation unit that registers a top position of content as a reproduction start position of the content and a predetermined value as a reproduction time duration of the content in an edit list when a reproduction start time of the content is later than a reproduction start time of the content on a movie time scale, the edit list associating the reproduction start position of the content with the reproduction time duration of the content reproduced from the reproduction start position; and a file generation unit that generates a file in an MP4 Fragmented Movie format, the file containing the edit list generated by the edit list generation unit and the content.

An information processing method according to the first aspect of the present disclosure corresponds to the information processing apparatus according to the first aspect of the present disclosure.

In the first aspect of the present disclosure, a top position of content and a predetermined value are respectively registered as a reproduction start position of the content and a reproduction time duration of the content in an edit list when a reproduction start time of the content is later than a reproduction start time of the content on a movie time scale, the edit list associating the reproduction start position of the content with the reproduction time duration of the content reproduced from the reproduction start position; and a file in an MP4 Fragmented Movie format is generated, the file containing the edit list generated by processing of the edit list generation step and the content.

An information processing apparatus according to a second aspect of the present disclosure is an information processing apparatus including: an extraction unit that extracts an edit list from a file in an MP4 Fragmented Movie format, the file containing the edit list and content, a top position of the content and a predetermined value being respectively registered as a reproduction start position of the content and a reproduction time duration of the content reproduced from the reproduction start position in the edit list when a reproduction start time of the content is later than a reproduction start time of the content on a movie time scale, the edit list associating the reproduction start position of the content with the reproduction time duration of the content; and a reproduction unit that reproduces the content at a time later than the reproduction start time on the movie time scale by a difference between the reproduction start time of the content and the reproduction start time on the movie time scale on the basis of the edit list extracted by the extraction unit when the reproduction start time of the content is later than the reproduction start time of the content on the movie time scale.

An information processing method according to the second aspect of the present disclosure corresponds to the information processing apparatus according to the second aspect of the present disclosure.

In the second aspect of the present disclosure, an edit list is extracted from a file in an MP4 Fragmented Movie format, the file containing the edit list and content, a top position of the content and a predetermined value being respectively registered as a reproduction start position of the content and a reproduction time duration of the content reproduced from the reproduction start position in the edit list when a reproduction start time of the content is later than a reproduction start time of the content on a movie time scale, the edit list associating the reproduction start position of the content with the reproduction time duration of the content; and the content is reproduced at a time later than the reproduction start time on the movie time scale by a difference between the reproduction start time of the content and the reproduction start time on the movie time scale on the basis of the edit list extracted by the extraction unit when the reproduction start time of the content is later than the reproduction start time of the content on the movie time scale.

Note that the information processing apparatuses according to the first and second aspects can be achieved by causing a computer to execute a program.

Further, the program executed by the computer to achieve the information processing apparatuses according to the first and second aspects can be provided by being transmitted via a transmission medium or being recorded in a recording medium.

Advantageous Effects of Invention

According to the first aspect of the present disclosure, it is possible to generate an edit list. In particular, it is possible to generate an edit list in the case where the reproduction start time of content contained in a file in the MP4 Fragmented Movie format is later than the reproduction start time in a movie time scale.

According to the second aspect of the present disclosure, it is possible to reproduce content on the basis of the edit list. In particular, it is possible to reproduce content on the basis of the edit list in the case where the reproduction start time of content contained in a file in the MP4 Fragmented Movie format is later than the reproduction start time in a movie time scale.

It should be noted that the effect described here is not necessarily limitative and may be any effect described in the present disclosure.

BRIEF DESCRIPTION OF DRAWINGS

FIG. 5 A diagram showing a configuration example of an edit list.

FIGS. 9A and 9B A diagram showing an example of the edit list when a Composition offset is generated.

FIG. 11 A diagram showing an example of the edit list of an MP4 file in a format other than the Fragmented Movie format when a Starting offset is generated.

FIG. 13 A diagram showing the first example of the edit list of a Fragmented MP4 file when a Starting offset is generated.

FIG. 15 A diagram showing the second example of the edit list of a Fragmented MP4 file when a Starting offset is generated.

MODE(S) FOR CARRYING OUT THE INVENTION

Hereinafter, the premise of the present disclosure and embodiments for carrying out the present disclosure (hereinafter, referred to as embodiments) will be described. Note that descriptions will be made in the following order.

1. First Embodiment: Information Processing System (FIG. 1 to FIG. 19)

Figure 20:
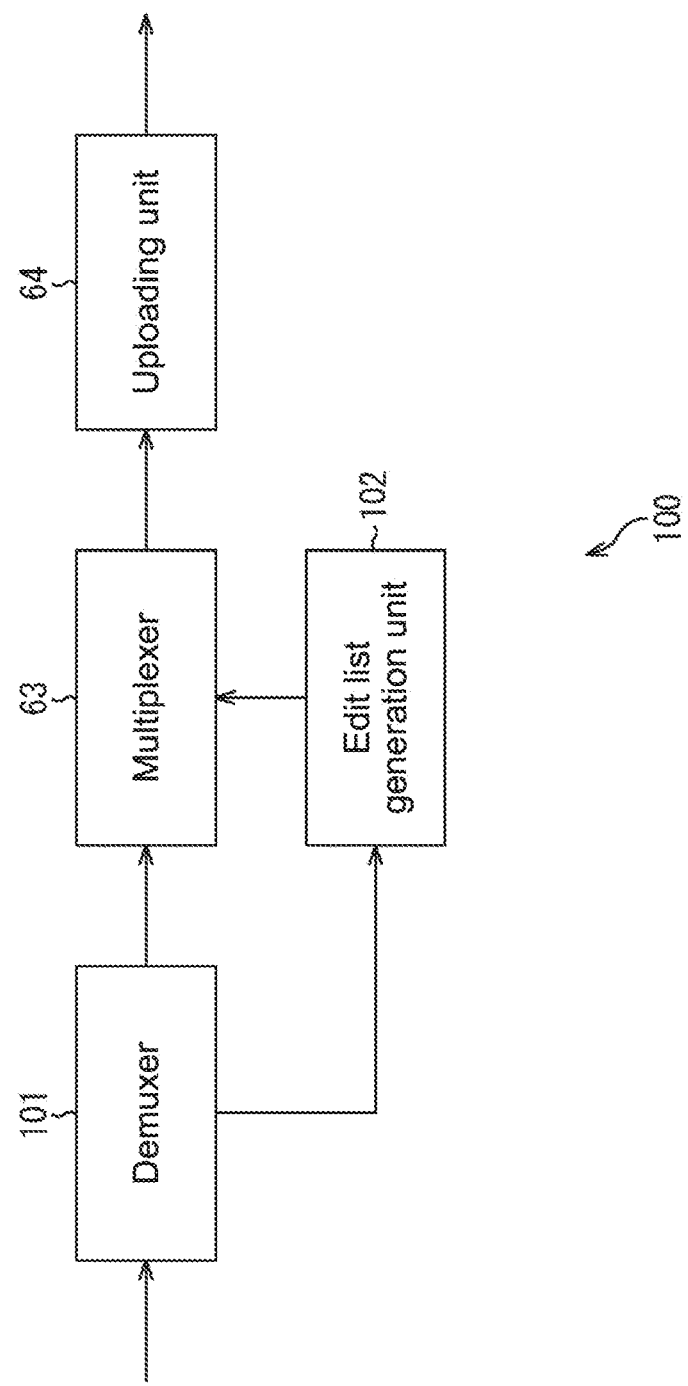
FIG. 20 A block diagram showing a configuration example of a file generation unit according to a second embodiment of the information processing system to which the present disclosure is applied.
Figure 21:
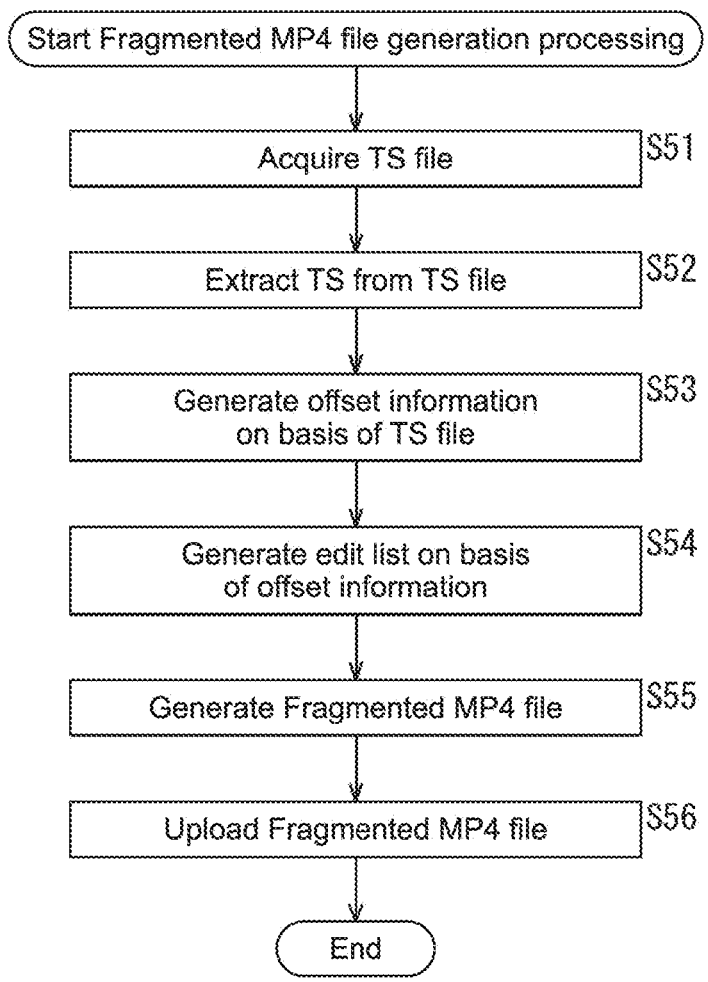
FIG. 21 A flowchart describing the Fragmented MP4 file generation processing performed by the file generation unit in FIG. 20.

2. Second Embodiment: Information Processing System (FIG. 20 and FIG. 21)

Figure 22:
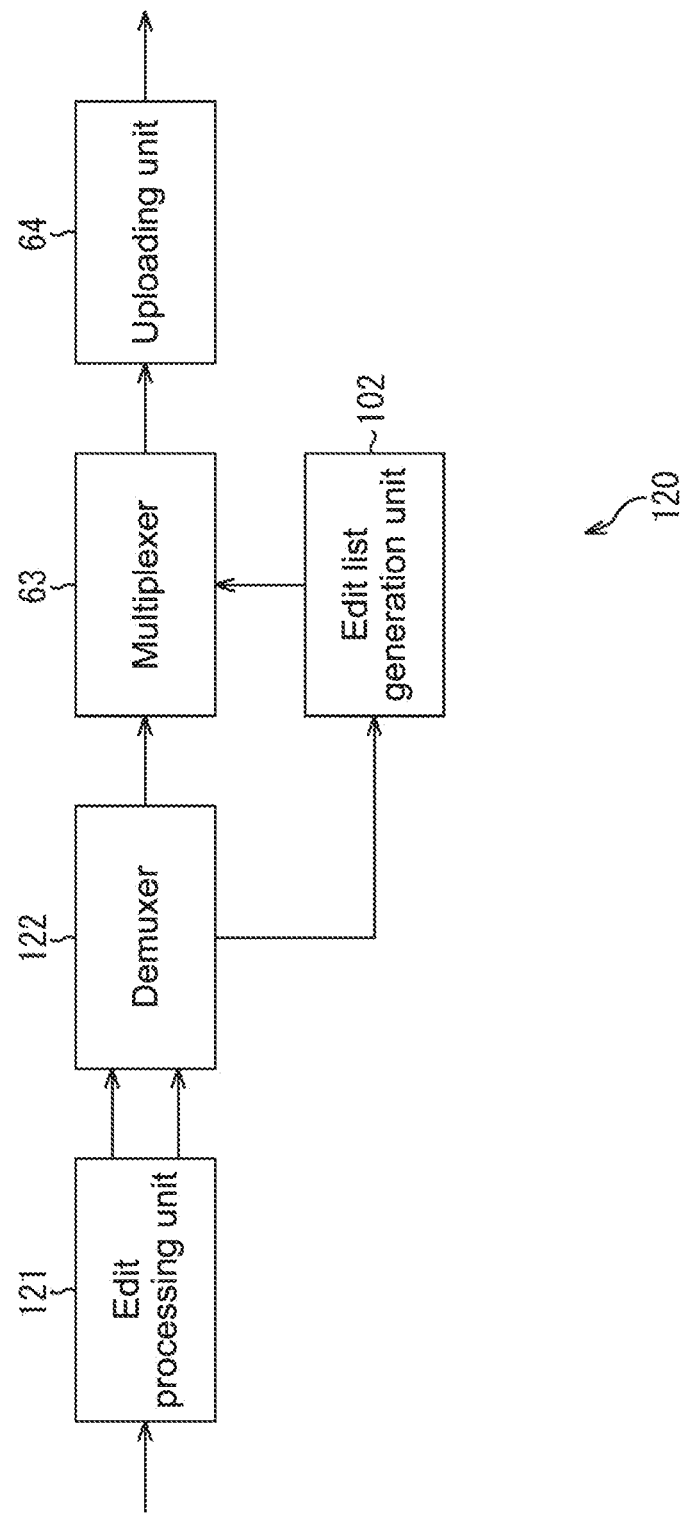
FIG. 22 A block diagram showing a configuration example of a file generation unit according to a third embodiment of the information processing system to which the present disclosure is applied.
Figure 23:
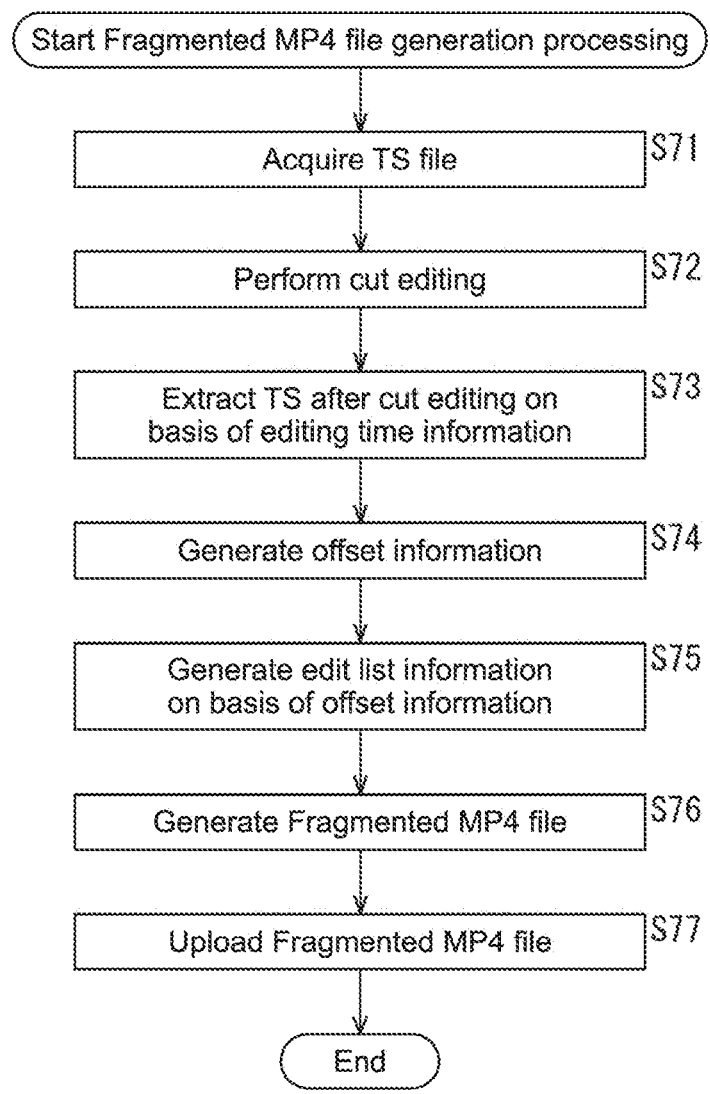
FIG. 23 A flowchart describing the Fragmented MP4 file generation processing performed by the file generation unit in FIG. 22.

3. Third Embodiment: Information Processing System (FIG. 22 and FIG. 23)

Figure 24:
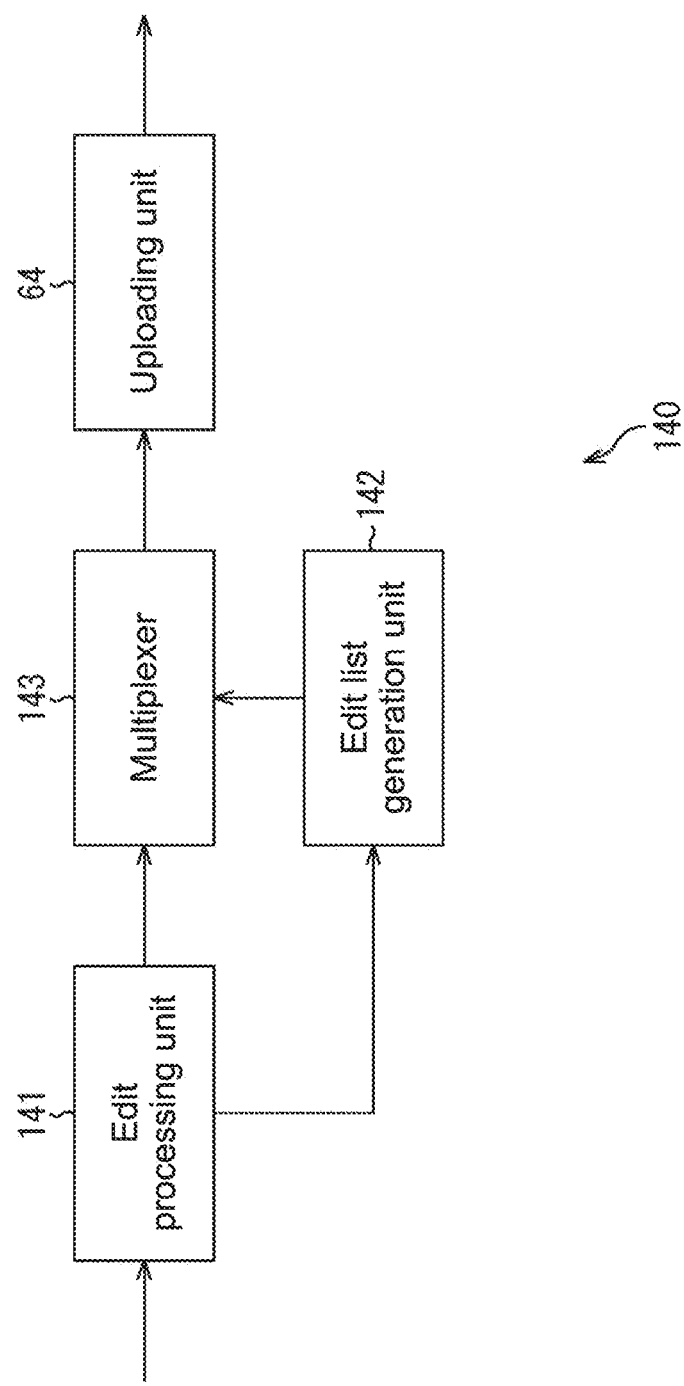
FIG. 24 A block diagram showing a configuration example of a file generation unit according to a fourth embodiment of the information processing system to which the present disclosure is applied.
Figure 25:
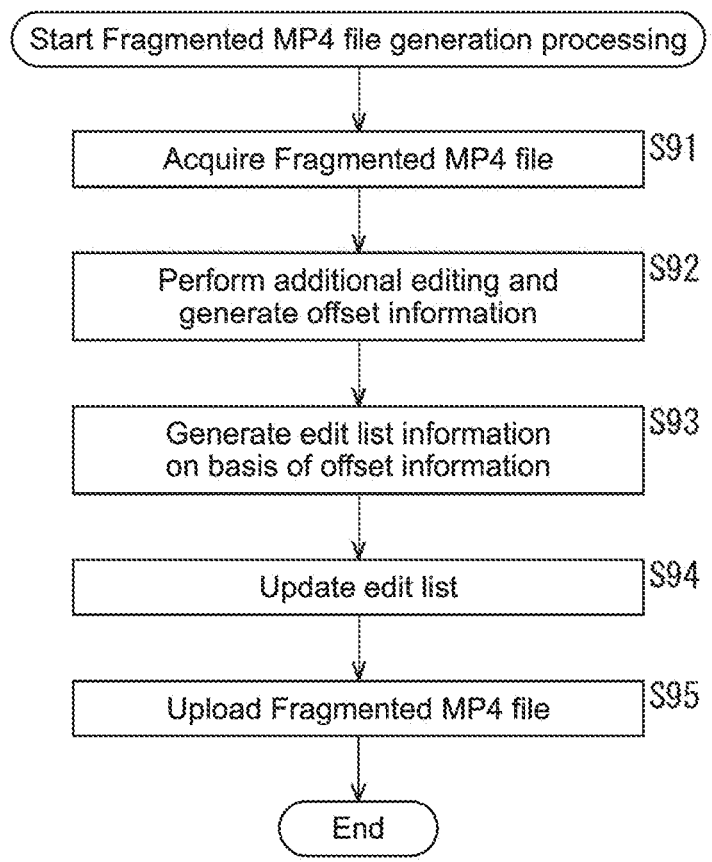
FIG. 25 A flowchart describing the MP4 file generation processing performed by the file generation unit in FIG. 24.

4. Fourth Embodiment: Information Processing System (FIG. 24 and FIG. 25)

Figure 26:
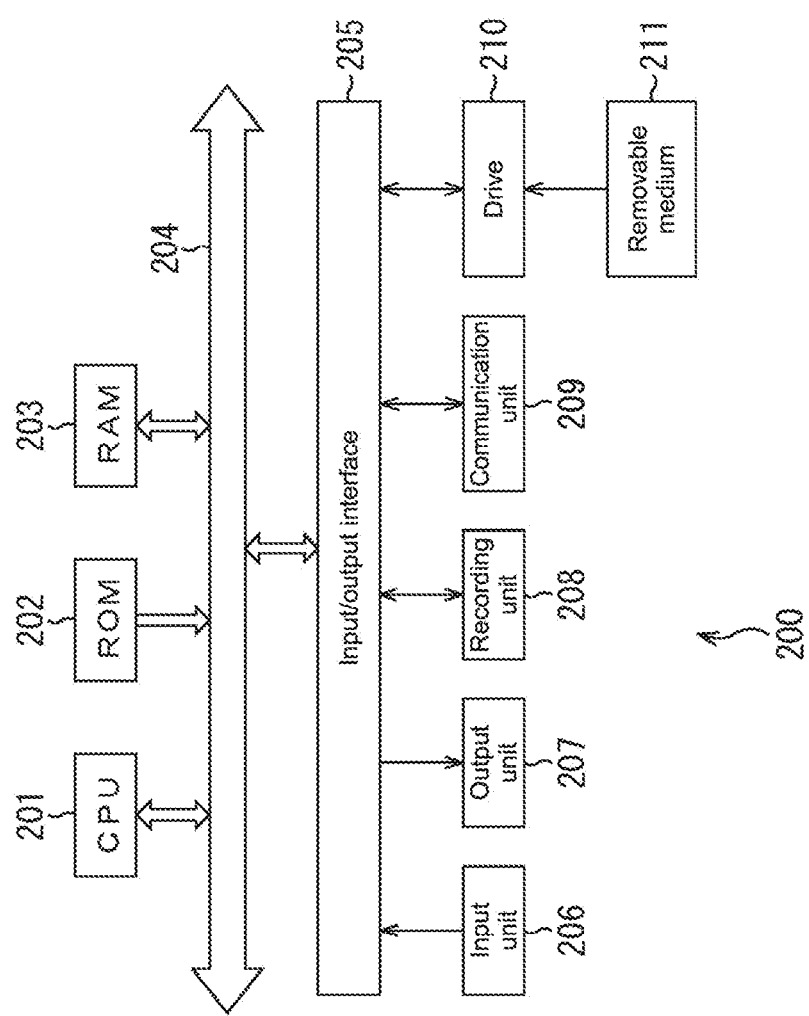
FIG. 26 A block diagram showing a configuration example of hardware of a computer.

5. Fifth Embodiment: Computer (FIG. 26)

First Embodiment (Overview of First Embodiment of Information Processing System)

Figure 1:
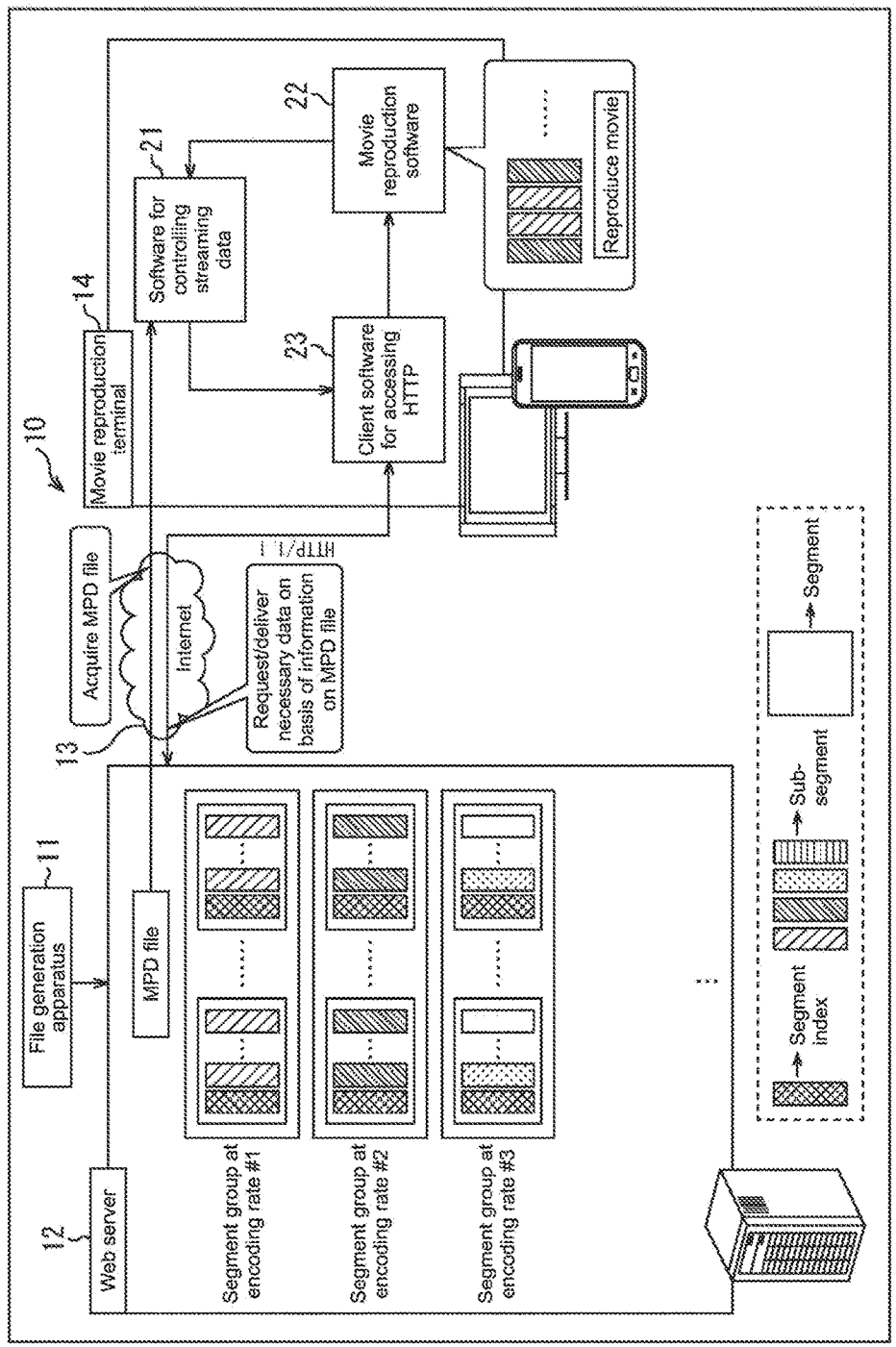
FIG. 1 A diagram describing the overview of a first embodiment of an information processing system to which the present disclosure is applied.

FIG. 1 is a diagram describing the overview of a first embodiment of an information processing system to which the present disclosure is applied.

A web server 12 connected to a file generation apparatus 11 is connected to a movie reproduction terminal 14 via an Internet 13, thereby configuring an information processing system 10 in FIG. 1.

In the information processing system 10, the web server 12 delivers a file in an MP4 Fragmented Movie format of movie content (hereinafter, referred to simply as the Fragmented MP4 file), which is generated by the file generation apparatus 11, to the movie reproduction terminal 14 by a method conforming to MPEG-DASH.

Specifically, the file generation apparatus 11 (information processing apparatus) encodes data such as image data and audio data of the movie content at a plurality of encoding rates to generate an encoded stream. The file generation apparatus 11 divides the generated encoded stream into time units of approximately several seconds to 10 seconds, which are called segments, for each encoding rate. The file generation apparatus 11 generates the Fragmented MP4 file, which includes the encoded stream, an edit list, and the like, for each segment, and uploads it to the web server 12.

Note that although the encoded streams having different encoding rates are generated here, encoded streams may be generated under a different condition other than the encoding rate (e.g., size of an image). Further, it may be also possible to generate encoded streams under two or more different conditions.

The file generation apparatus 11 generates also an MPD (Media Presentation Description) file for managing the Fragmented MP4 file and the like. The file generation apparatus 11 uploads the MPD file to the web server 12.

The web server 12 stores the Fragmented MP4 file and the MPD file uploaded from the file generation apparatus 11. In the example of FIG. 1, there are three kinds of encoding rates, and the Fragmented MP4 files in the respective segments are stored for each of the three encoding rates. The web server 12 transmits the stored Fragmented MP4 file and the stored MPD file to the movie reproduction terminal 14 in response to a request from the movie reproduction terminal 14.

The movie reproduction terminal 14 (information processing apparatus) executes a software for controlling streaming data (hereinafter, referred to as the controlling software) 21, a movie reproduction software 22, a client software for accessing HTTP (HyperText Transfer Protocol) (hereinafter, referred to as the accessing software) 23, and the like.

The controlling software 21 is software for controlling data streamed from the web server 12. Specifically, the controlling software 21 causes the movie reproduction terminal 14 to acquire the MPD file from the web server 12. Further, the controlling software 21 makes a request of transmitting the Fragmented MP4 file to be reproduced, to the accessing software 23 on the basis of the MPD file and reproduction target information that represents a reproduction time and the like of a reproduction target, which is specified by the movie reproduction software 22.

The movie reproduction software 22 is software for reproducing the encoded stream acquired from the web server 12. Specifically, the movie reproduction software 22 specifies the reproduction target information for the controlling software 21. Further, when receiving a notification of reception start from the accessing software 23, the movie reproduction software 22 decodes the encoded stream contained in the Fragmented MP4 file on the basis of the edit list contained in the Fragmented MP4 file received by the movie reproduction terminal 14. The movie reproduction software 22 outputs image data and audio data acquired as a result of the decoding.

The accessing software 23 is software for controlling the communication using HTTP with the web server 12 via the Internet 13. Specifically, the accessing software 23 causes the movie reproduction terminal 14 to transmit a request of transmitting the Fragmented MP4 file to be reproduced in response to a request from the controlling software 21. Further, the accessing software 23 causes the movie reproduction terminal 14 to start receiving the Fragmented MP4 file transmitted from the web server 12 in response to the transmission request, and supplies a notification of the reception start to the movie reproduction software 22.

(Configuration Example of Fragmented MP4 File)

Figure 2:
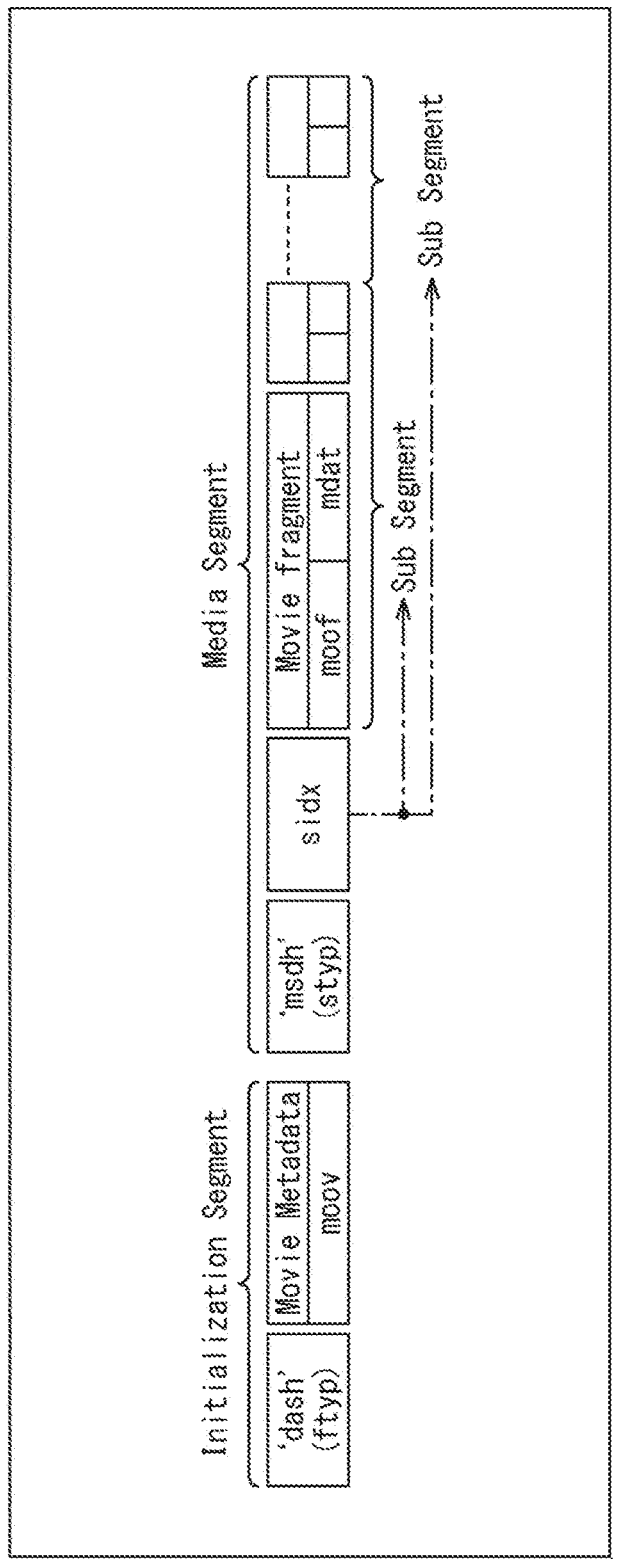
FIG. 2 A diagram showing a configuration example of a Fragmented MP4 file.

FIG. 2 is a diagram showing a configuration example of the Fragmented MP4 file.

The Fragmented MP4 file has a box structure and includes an initialization segment and one or more media segments.

The initialization segment includes an ftyp box (File Type Box) and a moov box (Movie Box) of the boxes included in the Fragmented MP4 file.

The ftyp box is a box put at the top of the file, and the type of the file format is described in the ftyp with a 4CharacterCode. Here, in the ftyp, "dash" is described as the 4CharacterCode representing MPEG-DASH as the file format, for example.

In the moov box, metadata of movie (Movie Metadata) containing one or more tracks (details thereof will be described later) reproduced at the same time is described. Because the format of the Fragmented MP4 file is a Fragmented Movie format, the moov box includes no corresponding mdat box.

The media segment includes a styp box (Segment File Type Box), a sidx box (Segment index to Movie Fragments Box), and one or more Movie fragments.

In the styp box, the format of the segment is described with a 4CharacterCode. Here, in the styp box, "msdh" is described as the 4CharacterCode representing the media segment as the format of the segment, for example.

In the sidx box, position information representing a position in the Fragmented MP4 file of a sub-segment (subsegment) containing one or more Movie fragments is described, for example.

The Movie fragment includes a moof box (Movie Fragment Box) and an mdat box (Media Data Box). In the moof box, time management information and address management information of the encoded stream put in the mdat box are described. In the mdat box, the encoded stream having an arbitrary time length is put for each sample. The sample is the minimum access unit of the encoded stream, and corresponds to one frame, for example.

Since there is no mdat box corresponding to the moov box as described above, the encoded stream of the sample at the top placed in the mdat box corresponding to the moof box is an encoded stream of the sample at the top of the Fragmented MP4 file.

(Configuration Example of Moov Box)

Figure 3:
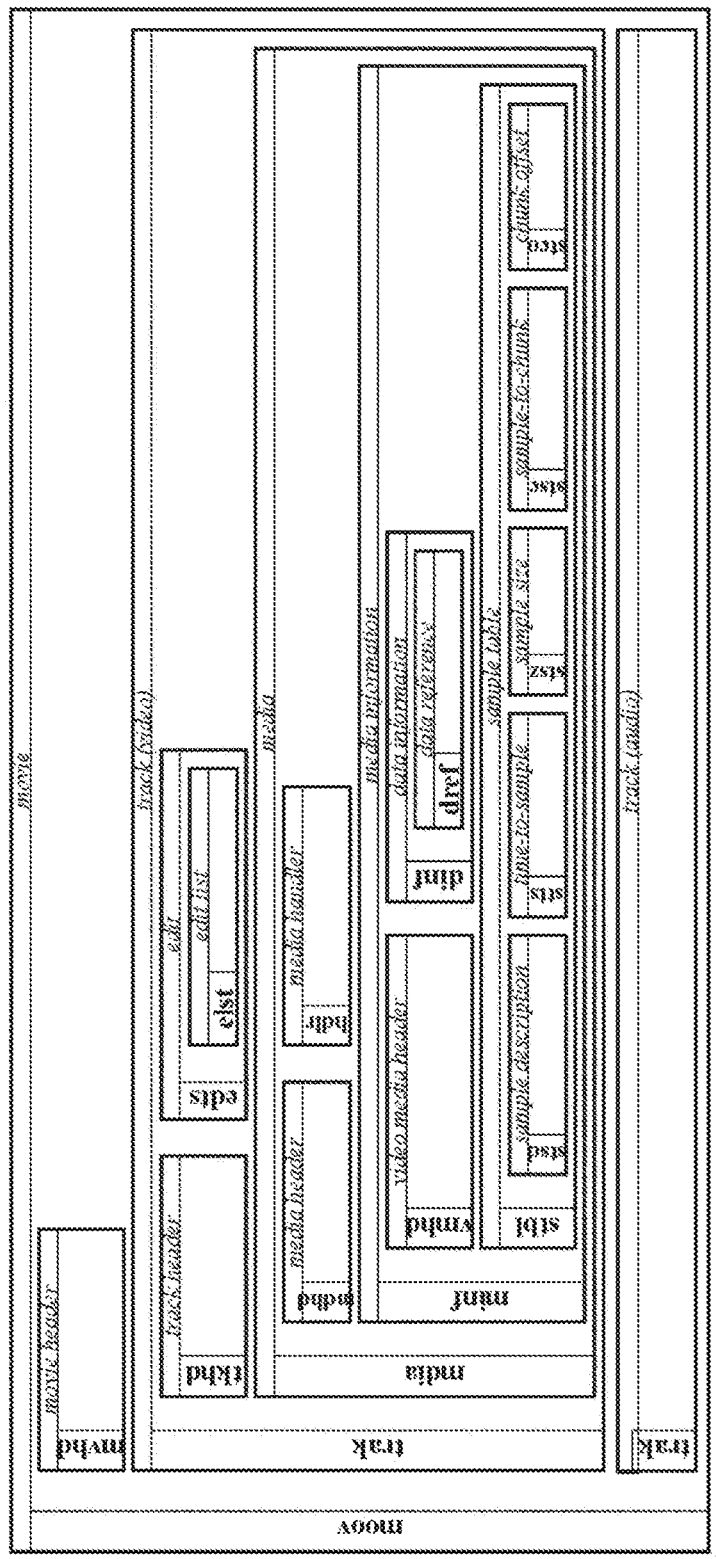
FIG. 3 A diagram showing a configuration example of a moov box in FIG. 2.

FIG. 3 is a diagram showing a configuration example of the moov box in FIG. 2.

As shown in FIG. 3, in the moov box, an mvhd box (Movie Header Box) is put. In the Movie Header box, information for setting a movie time scale, information on expansion and reduction of image data of movie, and rotation of movie, information on the reproduction rate of movie, and the like are described. The movie time scale is a reproduction time duration axis commonly used for movie.

In the Movie box, also a Trak box (Track Box) is put for each track. The track is a management unit of the encoded stream of the movie content, and a sample group of the same kind (image, audio, and the like). In the Trak box, management information on the corresponding track is described.

Specifically, in the Trak box, a tkhd box (Track Header Box), an edts box (Edit Box), and an mdia box (Media Box) are put. In the tkhd box, screen combining information containing the position in a display screen of an image is described in the case where the track is a sample group of images. Further, in the tkhd box, also track information such as information representing the relationship between tracks is described.

In the edts box, the edit list of the track is described. The edit list associates the reproduction start position of the encoded stream of content with the reproduction time duration of the encoded stream reproduced from the reproduction position in the order of reproduction, i.e., in the order from the reproduction start time on the movie time scale, as described above. Specifically, the edit list is information for controlling reproduction of the tracks in the entire movie.

Note that it does not necessarily need to describe the edit list in the edts box. In this case, content is reproduced with the reproduction start time on the movie time scale as the reproduction start time of the content corresponding to the edts box, i.e., the reproduction start time on a media time scale to be described later.

In the mdia box, an mdhd box (Media Header Box), an hdlr box (Media Handler Box), and an minf box (Media Information Box) to which information on a medium (Media) as the encoded stream of the track is described are put.

In the mdhd box and the hdlr box, information representing the kind of data of a medium, information for setting the media time scale that is a reproduction time duration axis in units of media (in units of tracks), and the like are described. In the case where the medium is the encoded stream of audio, also information representing the language of the audio is described in the mdhd box and the hdlr box.

In the minf box, a dinf box (Data Information Box) and an stbl box (Sample Table Box) are put. Further, in the case where the medium is the encoded stream of an image, also a vmhd box (Video Media Header Box) is put in the Media Information box.

In the dinf box, the storing place of the medium and the reference method are described. The stbl box includes an stsd box (Sample Description Box), an stts box (Time to Sample Box), an stsz box (Sample Size Box), an stsc box (Sample To Chunk Box), and an stco box (Chunk Offset Box).

In the stsd box, one or more sample entries containing Codec Configuration information applied to the medium are described. An ID specific to each sample entry is given to the sample entry, and the ID is referenced by the stsc box. The Codec Configuration information is information related to encoding, such as an encoding method.

In the stts box, a time length on the media time scale of the medium of each sample is described. Specifically, in the stts box, a table in which the time length is associated with the number of consecutive media in units of samples in the time length in the order from the top sample is described.

In the stss box, the data size of the medium of each sample is described in the order from the top sample. In the stsc box, the number of samples contained in each chunk of the medium and the ID of the sample entry of the chunk are described in the order from the top chunk. The chunk is the address management unit of the medium.

In the stco box, a file offset of each chunk of the medium is described in the order from the top chunk.

(Configuration Example of Movie)

Figure 4:
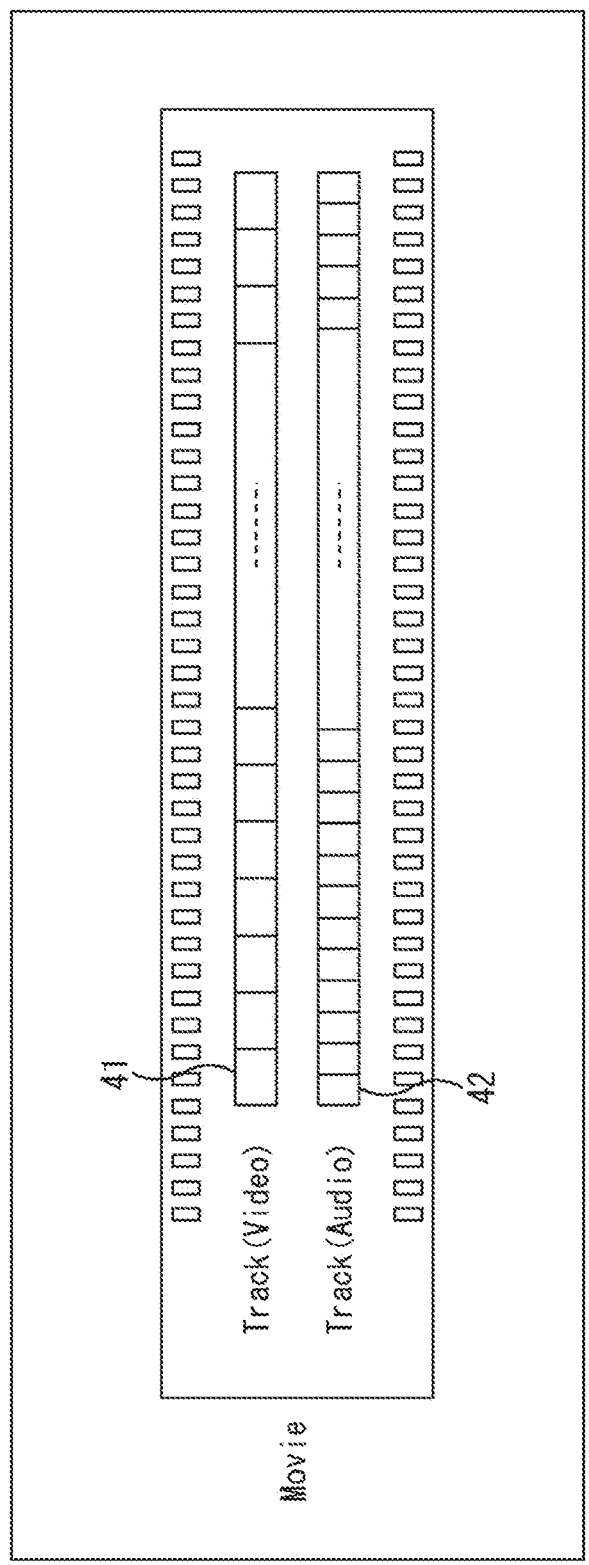
FIG. 4 A diagram showing a configuration example of movie.

FIG. 4 is a diagram showing a configuration example of movie.

In the example of FIG. 4, the movie (Movie) includes a track of images (Video) and s track of audio (Audio). The track of images includes a plurality of samples 41, and the track of audio includes a plurality of samples 42.

(Description of Edit List)

Figure 6:
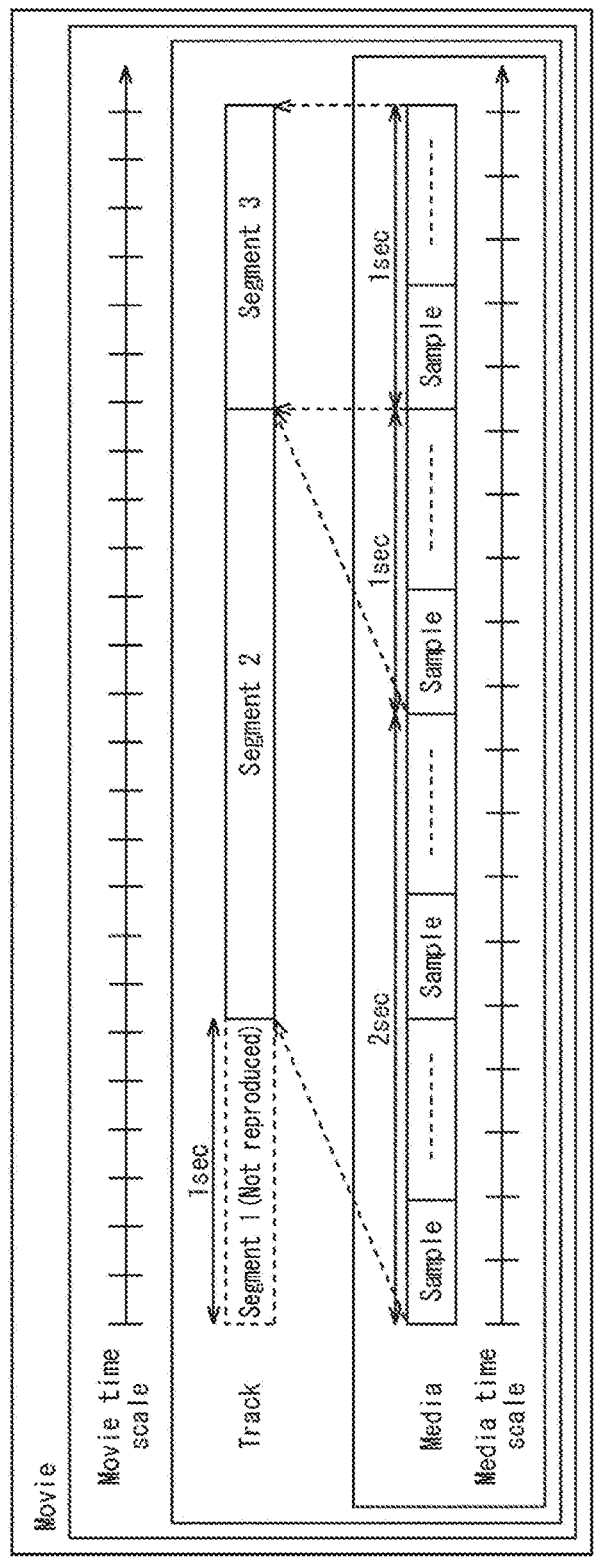
FIG. 6 A diagram describing reproduction on the basis of the edit list in FIG. 5.

FIG. 5 is a diagram showing a configuration example of an edit list. FIG. 6 is a diagram describing reproduction on the basis of the edit list in FIG. 5.

As shown in FIG. 5, in the edit list, Segment Duration, Media Time, and Media Rate are associated with each other as edit list information in the order from the reproduction start time on the movie time scale. The Media Time is a time on the media time scale, which represents the reproduction start position of the medium corresponding to the edts box containing the Media Time. The Segment Duration is the reproduction time duration of the medium reproduced from the reproduction start position on the movie time scale, which is represented by the corresponding Media Time. The Media Rate is a reproduction rate of the medium to be reproduced.

Note that in the example of FIG. 5, 1 second in the movie time scale is 90000, and 1 second in the media time scale is 30000.

In the edit list in FIG. 5, Segment Duration "90000(1 sec)," Media Time "−1(Empty)," and Media Rate "1.0" are registered as the top edit list information. Note that the Media Time "−1(Empty)" is information representing that nothing is reproduced. Therefore, as shown in FIG. 6, nothing is reproduced during the time from 0 second to 1 second on the movie time scale, as the track corresponding to the edit list in FIG. 5.

In the edit list in FIG. 5, Segment Duration "180000(2 sec)," Media Time "0(0 sec)," and Media Rate "1.0" are registered as the second edit list information. Therefore, as shown in FIG. 6, a medium is reproduced at a 1× rate during the time from 1 second to 3 second on the movie time scale and for 2 seconds from 0 second on the media time scale.

In the edit list in FIG. 5, Segment Duration "90000(1 sec)," Media Time "90000(3 sec)," and Media Rate "1.0" are registered as the third edit list information. Therefore, as shown in FIG. 6, the medium is reproduced at a 1× rate during the time from 3 second to 4 second on the movie time scale and for 1 second from 3 second on the media time scale.

As described above, according to the edit list in FIG. 5, it is possible to sequentially reproduce a medium from 0 second to 2 second on the media time scale and a medium from 3 second to 4 second on the media time scale at a 1× rate after 1 second of the reproduction start time on the movie time scale.

As described above, according to the edit list, it is possible to control the reproduction start time of the medium on the movie time scale corresponding to the edit list and the order of reproduction. That is, with the edit list, it is possible to perform non-destructive editing (Non-linear edit).

(Example of Reproduction Start Time of Medium)

Figure 7:
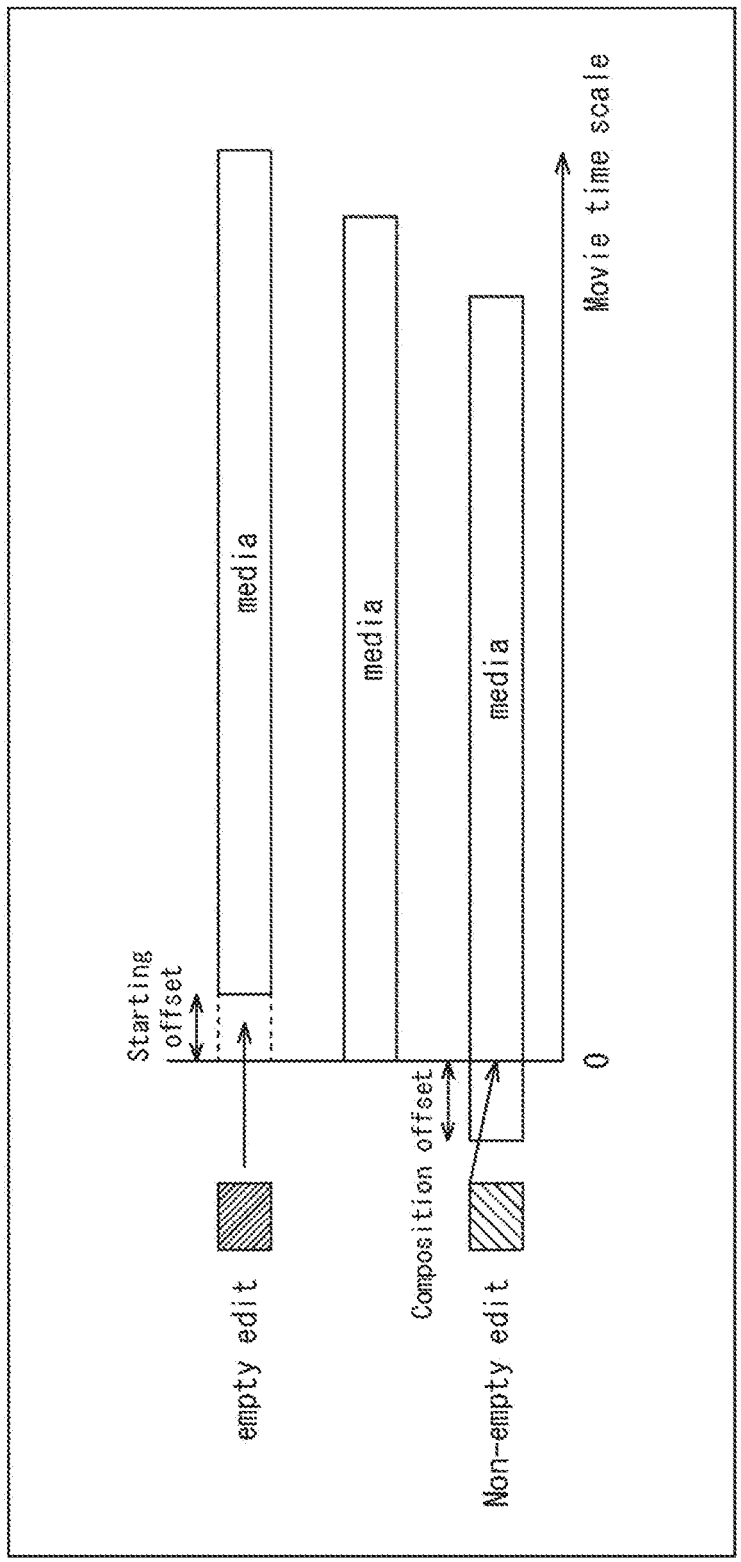
FIG. 7 A diagram showing an example of the reproduction start time of a medium.

FIG. 7 is a diagram showing an example of the reproduction start time of a medium.

The reproduction start time of the medium is later than the reproduction start time on the movie time scale by a Starting offset as shown in the upper part of FIG. 7, is the same as the reproduction start time on the movie time scale as shown in the middle part of FIG. 7, or is earlier than the reproduction start time on the movie time scale by a Composition offset as shown in the lower part of FIG. 7. The Starting offset and Composition offset each represent a difference between the reproduction start time of the medium and the start time on the movie time scale.

In the case where the reproduction start time of the medium is later than the reproduction start time on the movie time scale by the Starting offset as shown in the upper part of FIG. 7, the edit list information containing Media Time "−1" is registered as empty edit information in the edit list. Further, because the edit list containing only the empty edit information is inhibited in the MP4 standards, also edit list information other than the empty edit information is registered in the edit list.

In the case where the reproduction start time of the medium is the same as the reproduction start time on the movie time scale as shown in the middle part of FIG. 7, it does not need to generate the edit list.

In the case where the reproduction start time of the medium is earlier than the reproduction start time on the movie time scale by the Composition offset as shown in the lower part of FIG. 7, i.e., the top of the medium is not reproduced, the edit list information containing a time of the Composition offset on the media time scale as the Media Time is registered as Non-empty edit information in the edit list.

(Description of Edit List when Composition Offset is Generated)

Figure 8:
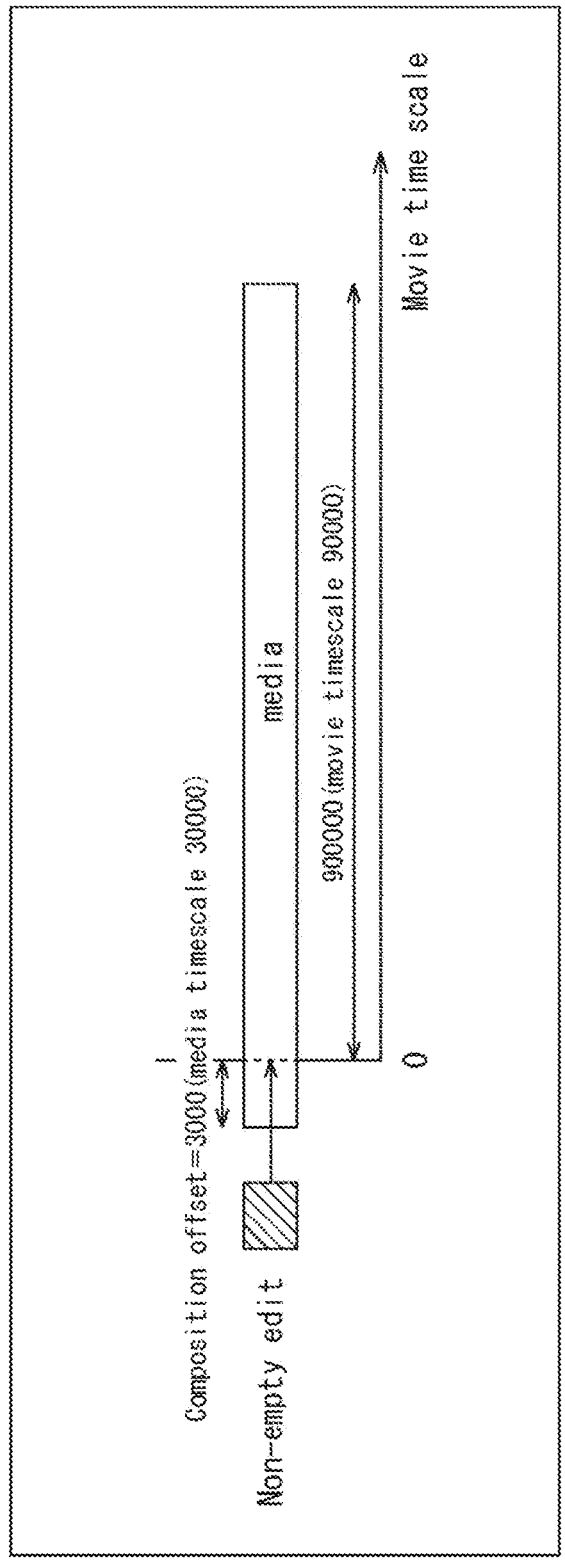
FIG. 8 A diagram showing an example of a medium when a Composition offset is generated.

FIG. 8 is a diagram showing an example of a medium when a Composition offset is generated. FIGS. 9A and 9B are diagrams showing an example of the edit list when the Composition offset is generated as shown in FIG. 8.

Note that in the examples in FIG. 8 and FIGS. 9A and 9B, 1 second in the movie time scale is 90000, and 1 second in the media time scale is 30000. Further, the reproduction rate of a medium is 1×.

In the case where the time of the Composition offset on the media time scale is 3000 (0.1 sec) and the time of the medium on the movie time scale is 90000 (10 sec) as shown in FIG. 8, it needs to generate an edit list as shown in part A of FIG. 9A in the case of an MP4 file in a format other than the Fragmented Movie format.

Specifically, as shown in FIG. 9A, it needs to respectively register "900000 (10 sec)" that is the time of the medium on the movie time scale, "3000 (0.1 sec)" that is the time of the Composition offset on the media time scale, and "1.0" as the Segment Duration, the Media Time, and the Media Rate in the edit list.

On the other hand, in the Fragmented MP4 file, "0" is defined as information representing that it is the Segment Duration of Non-empty edit information. Therefore, in the case where the reproduction start time of the medium is earlier than the reproduction start time on the movie time scale by the Composition offset, in only needs to register "0" as the Segment Duration of Non-empty edit information regardless of the time of the medium on the movie time scale.

Accordingly, it is possible to register Non-empty edit information even in the case where the time length of the medium put in the mdat box corresponding to the moof box cannot be recognized when the moov box is generated.

(Description of Edit List of MP4 File in Format other than Fragmented Movie Format when Starting Offset Is Generated)

Figure 10:
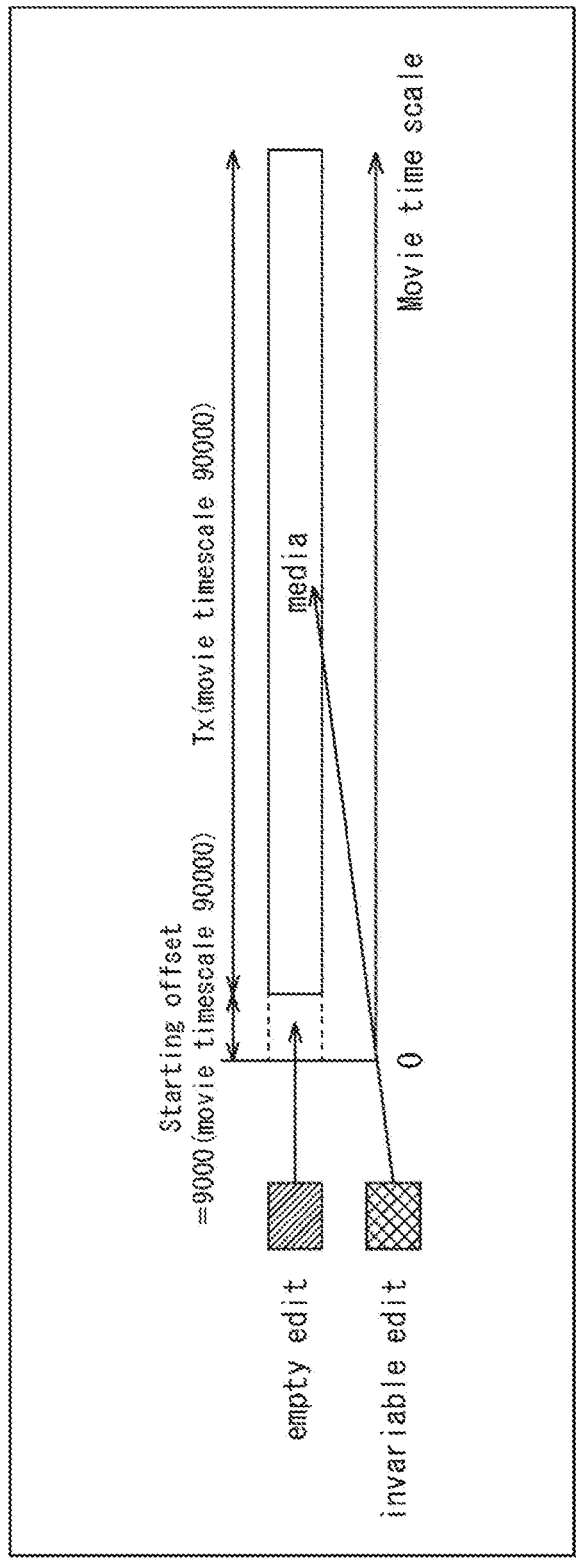
FIG. 10 A diagram showing an example of a medium when a Starting offset is generated.

FIG. 10 is a diagram showing an example of a medium when a Starting offset is generated. FIG. 11 is a diagram showing an example of the edit list of an MP4 file in a format other than the Fragmented Movie format when the Starting offset is generated as shown in FIG. 10.

Note that in the examples shown in FIG. 10 and FIG. 11, 1 second in the movie time scale is 90000, and the reproduction rate of a medium is 1×.

In the case where the time of the Starting offset on the movie time scale is 9000 (0.1 sec) and the time of the medium on the movie time scale is Tx as shown in FIG. 10, it needs to generate an edit list as shown in FIG. 11 in an MP4 file in a format other than the Fragmented Movie format.

Specifically, as shown in FIG. 11, empty edit information containing "−1 (Empty)" representing that nothing is reproduced, "9000 (0.1 sec)" that is the time of the Starting offset on the movie time scale, and "1.0" as the Media Time, the Segment Duration, and the Media Rate, respectively, is registered first in the edit list.

Next, in the edit list, edit information containing "Tx" that is the time of the medium on the movie time scale as the Segment Duration is registered as invariable edit information because it needs to register also edit list information other than the empty edit information. The Media Time of the invariable edit information is "0" that represents the reproduction start time on the media time scale, and the Media Rate is "1.0."

However, in the Fragmented MP4 file, there is no mdat box corresponding to the moov box and the time length of a medium put in the mdat box corresponding to the moof box cannot be recognized when a moov box is generated in some cases. For example, in the case where the medium is the encoded stream of live video, the time length of the medium is unknown until the shooting is finished.

Further, although it does not need to recognize the time length of a medium in the case where a Composition offset is generated, it needs to recognize the time length of the medium in the case where a Starting offset is generated. Therefore, processing of generating an edit list is complex. Specifically, because the method of generating an edit list is different for the kind of the offset, the processing of generating an edit list is complex.

Therefore, in the present disclosure, the edit list of the Fragmented MP4 file when a Starting offset is generated so as to be different from the edit list of the MP4 file in a format other than the Fragmented Movie format.

(Description of First Example of Edit List of Fragmented MP4 File when Starting offset Is Generated)

Figure 12:
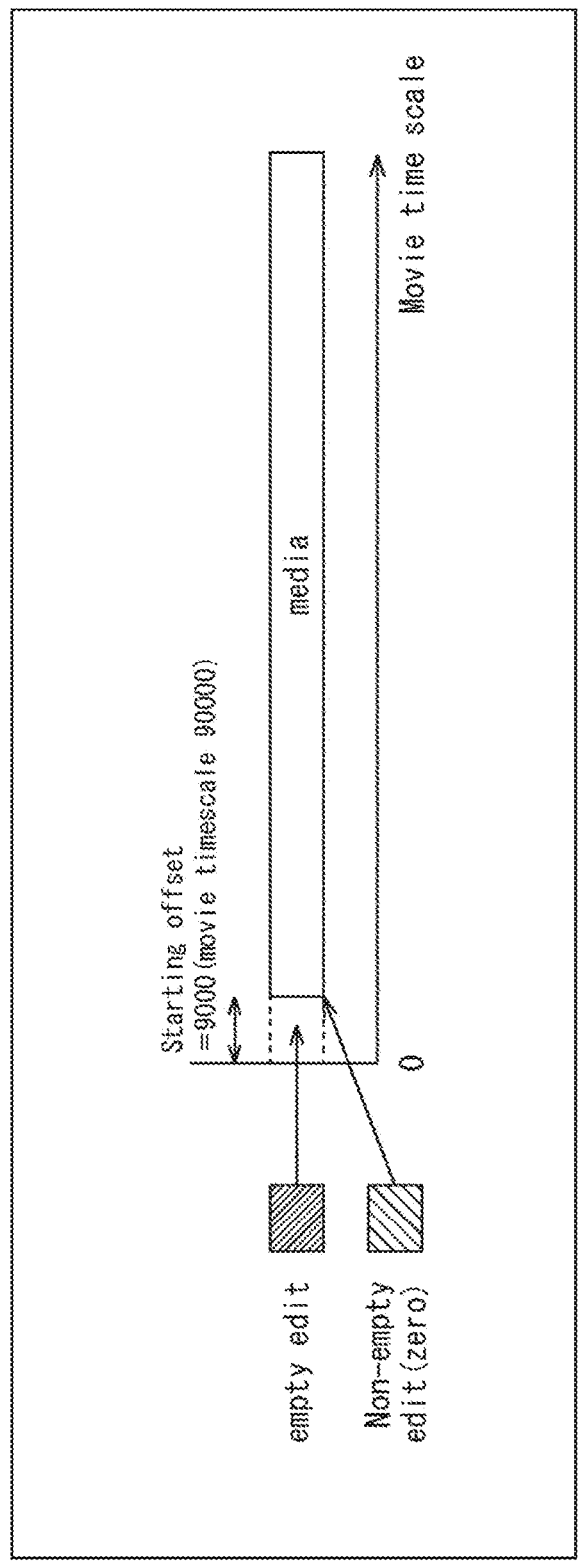
FIG. 12 A diagram describing a first example of the edit list of a Fragmented MP4 file when a Starting offset is generated.

FIG. 12 and FIG. 13 are each a diagram describing a first example of the edit list of a Fragmented MP4 file when a Starting offset is generated as shown in FIG. 10.

As shown in FIG. 12 and FIG. 13, in the edit list of the Fragmented MP4 file, for example, non-empty edit information in which the Media Time is "0" is registered as dummy edit list information instead of the invariable edit information in FIG. 11.

Specifically, as shown in FIG. 13, in the edit list, empty edit information is registered similarly to the case of FIG. 11. However, as the Segment Duration of the edit list information other than the empty edit information, "0" that represents that it is the Segment Duration of the dummy edit list information for registering the empty edit information in the edit list is registered.

Further, corresponding to the Segment Duration "0," the time on the media time scale, which represents the top position of a medium, i.e., "0" that represents the reproduction start time on the media time scale and "1.0" are respectively registered as the Media Time and the Media Rate.

(Description of Second Example of Edit List of Fragmented MP4 File when Starting Offset Is Generated)

Figure 14:
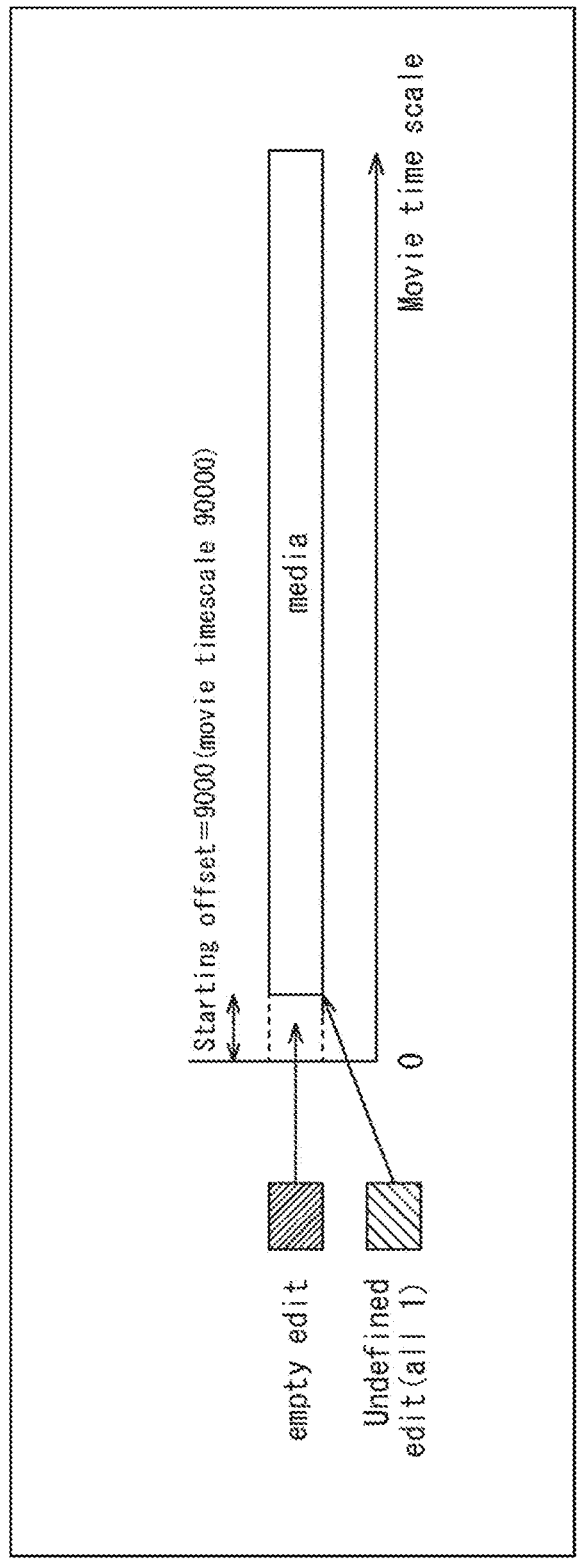
FIG. 14 A diagram describing a second example of the edit list of a Fragmented MP4 file when a Starting offset is generated.

FIG. 14 and FIG. 15 are each a diagram describing a second example of the edit list of a Fragmented MP4 file when a Starting offset is generated as shown in FIG. 10.

As shown in FIG. 14 and FIG. 15, in the edit list of the Fragmented MP4 file, for example, undefined edit information in which the Media Time is a value "0xFFFFFFFF" representing that it is an indefinite value is registered as dummy edit list information instead of the invariable edit in FIG. 11.

Specifically, as shown in FIG. 15, empty edit information is registered in the edit list, similarly to the case of FIG. 11. However, a value "0xFFFFFFFF" in which all bits are 1, which represents that it is the Segment Duration of dummy edit list information for registering empty edit information in the edit list is registered as the Segment Duration of the edit list information other than the empty edit information.

Further, corresponding to the Segment Duration "0xFFFFFFFF," the time on the media time scale, which represents the top position of a medium, i.e., "0" that represents the reproduction start time on the media time scale and "1.0" are respectively registered as the Media Time and the Media Rate.

As described above, in the present disclosure, a value representing that it is dummy edit list information for registering empty edit information in the edit list is registered as the Segment Duration of the edit list information other than the empty edit information.

Therefore, it is possible to register empty edit information even in the case where the time length of a medium put in the mdat box corresponding to the moof box cannot be recognized when the moov box is generated. Further, because the edit list can be generated without recognizing the time length of the medium, the authoring efficiency is improved.

Further, even in the case where a Starting offset is generated, it does not need to recognize the time length of a medium, similarly to the case where a Composition offset is generated. Further, processing of generating the edit list is not affected by a box other than the moov box. Therefore, the processing of generating the edit list is made easy.

Further, because the edit list information other than the empty edit information is registered in the edit list described in FIGS. 12 to 15, it does not violate the MP4 standards.

(Configuration Example of MP4 File Generation Unit)

Figure 16:
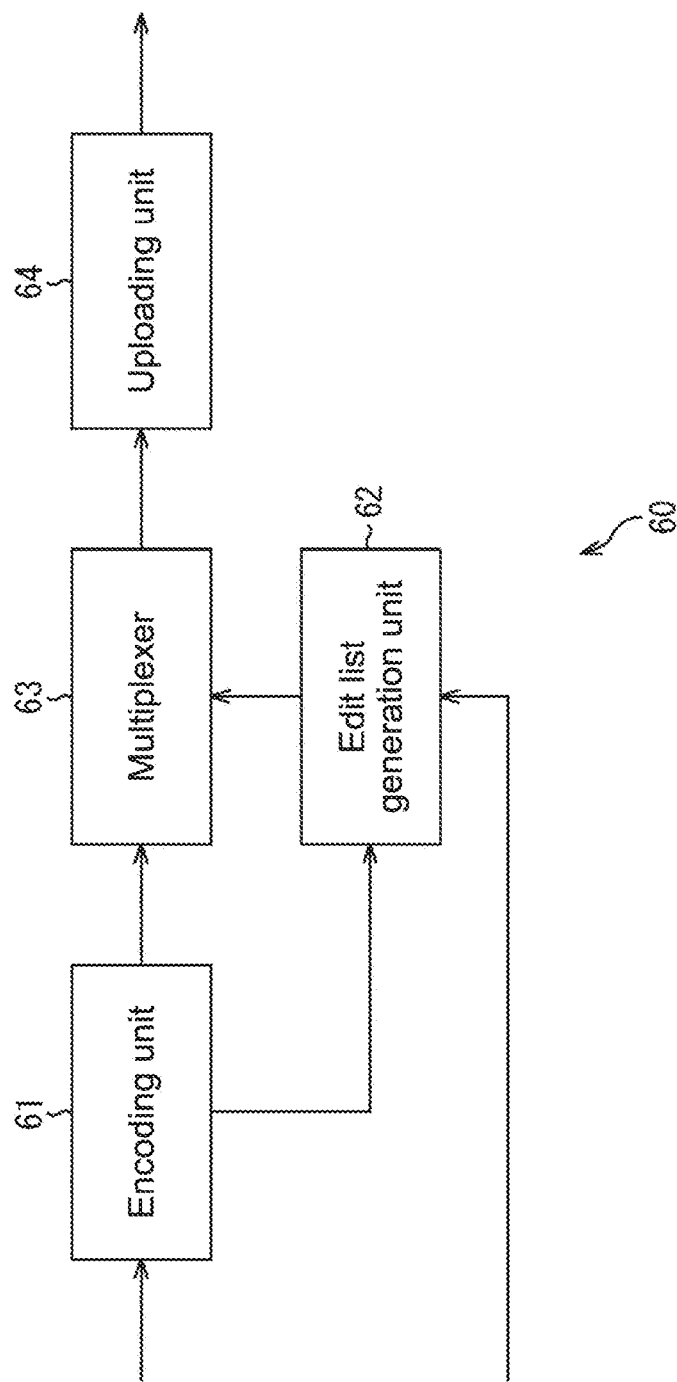
FIG. 16 A block diagram showing a configuration example of an MP4 file generation unit.

FIG. 16 is a block diagram showing a configuration example of the MP4 file generation unit of the file generation apparatus 11 in FIG. 1, which generates the Fragmented MP4 file.

A file generation unit 60 in FIG. 16 includes an encoding unit 61, an edit list generation unit 62, a multiplexer 63, and an uploading unit 64.

The encoding unit 61 of the file generation unit 60 acquires data such as image data and audio data of movie content. The encoding unit 61 encodes the acquired data at a plurality of encoding rates to generate an encoded stream. The encoding unit 61 divides the encoded stream into segment units for each encoding rate, and supplies it to the multiplexer 63.

Further, the encoding unit 61 generates, for each medium, Composition offset information that represents the difference in the display time between the picture at the top in the display order of the encoded streams in units of segments and the I picture at the top in the display order as a Composition offset, for example. The encoding unit 61 supplies the generated Composition offset information of each medium to the edit list generation unit 62.

The edit list generation unit 62 generates an edit list, for each medium, on the basis of the Composition offset information supplied from the encoding unit 61 and the Starting offset information that represents the Starting offset in units of segments input by a user or the like from the outside.

Specifically, the edit list generation unit 62 registers, for each medium, the time of the Composition offset on the media time scale, "0," and the reproduction rate of the medium as the Media Time of the edit list, the Segment Duration, and the Media Rate, respectively, on the basis of the Composition offset information. Further, the edit list generation unit 62 registers, for each medium, "0," "0" or "0xFFFFFFFF," and the reproduction rate of the medium as the Media Time of the edit list, the Segment Duration, and the Media Rate, respectively, on the basis of the Starting offset information. The edit list generation unit 62 supplies the generated edit list of each medium to the multiplexer 63.

The multiplexer 63 (file generation unit) generates the Fragmented MP4 file containing the encoded stream in units of segments and the edit list of each medium corresponding to the segment, for each encoding rate. Specifically, the multiplexer 63 puts the encoded stream in units of segments in an mdat box and the edit list of each medium in a moov box to generate a Fragmented MP4 file. The multiplexer 63 supplies the generated Fragmented MP4 file to the uploading unit 64.

The uploading unit 64 uploads, to the web server 12 in FIG. 1, the Fragmented MP4 file supplied from the multiplexer 63.

(Description of Processing of File Generation Unit)

Figure 17:
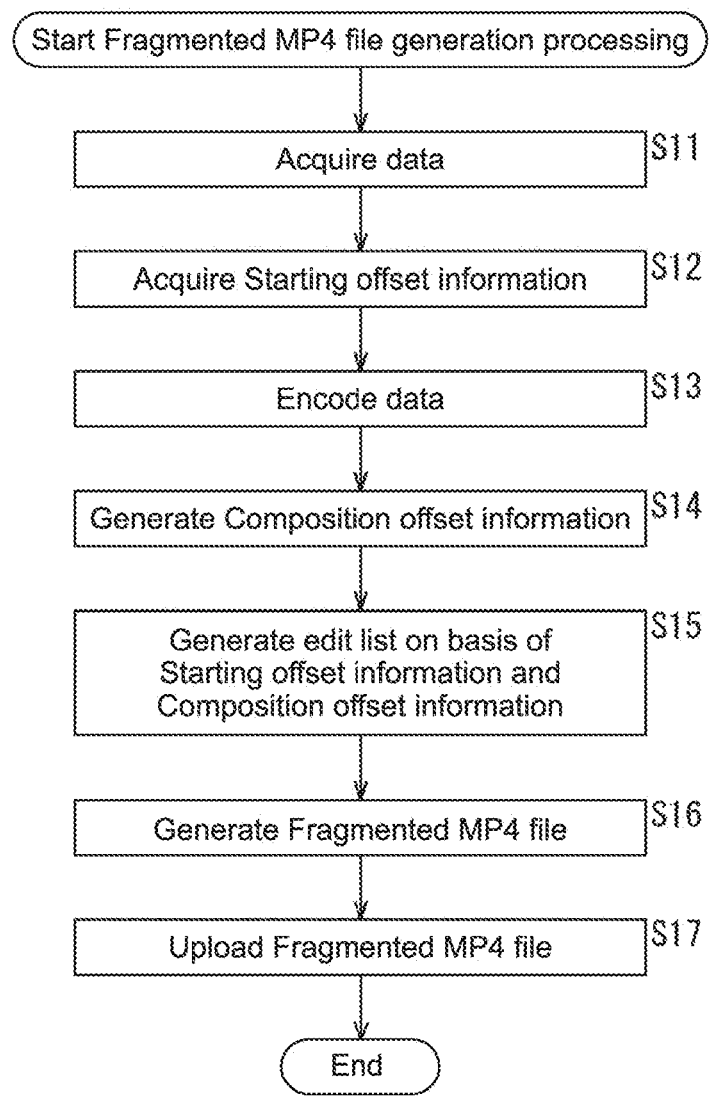
FIG. 17 A flowchart describing the Fragmented MP4 file generation processing performed by the file generation unit in FIG. 16.

FIG. 17 is a flowchart describing the Fragmented MP4 file generation processing performed by the file generation unit 60 in FIG. 16.

In Step S11 in FIG. 17, the encoding unit 61 of the file generation unit 60 acquires data such as image data and audio data of movie content. In Step S12, the edit list generation unit 62 acquires Starting offset information input by a user or the like from the outside.

In Step S13, the encoding unit 61 encodes the acquired data at a plurality of encoding rates to generate an encoded stream. The encoding unit 61 divides the encoded stream in segment units for each encoding rate, and supplies it to the multiplexer 63.

In Step S14, the encoding unit 61 generates Composition offset information for each medium, and supplies it to the edit list generation unit 62.

In Step S15, the edit list generation unit 62 generates, for each medium, an edit list on the basis of the acquired Starting offset information and the Composition offset information supplied from the encoding unit 61.

In Step S16, the multiplexer 63 generates a Fragmented MP4 file containing the encoded stream in units of segments and the edit list of each medium corresponding to the segment, for each encoding rate. The multiplexer 63 supplies the generated Fragmented MP4 file to the uploading unit 64.

In Step S17, the uploading unit 64 uploads, to the web server 12 in FIG. 1, the Fragmented MP4 file supplied from the multiplexer 63, and the processing is finished.

As described above, the file generation apparatus 11 respectively registers "0" and "0" or "0xFFFFFFFF" as the Media Time and the Segment Duration in the edit list in the case where a Starting offset is generated. Therefore, it is possible to generate an edit list even in the case where the time length of the medium cannot be recognized. As a result, the movie reproduction terminal 14 is capable of reproducing the medium from the time later than the reproduction start time on the movie time scale by the Starting offset on the basis of the edit list.

Further, because the encoding unit 61 does not need to recognize the time length of a medium and supply it to the edit list generation unit 62 in the case where a Composition offset is generated, the processing efficiency of the encoding unit 61 is excellent. Further, because a user does not need to recognize the time length of a medium and supply it to the edit list generation unit 62 in the case where a Starting offset is generated, the authoring efficiency is excellent.

(Functional Configuration Example of Movie Reproduction Terminal)

Figure 18:
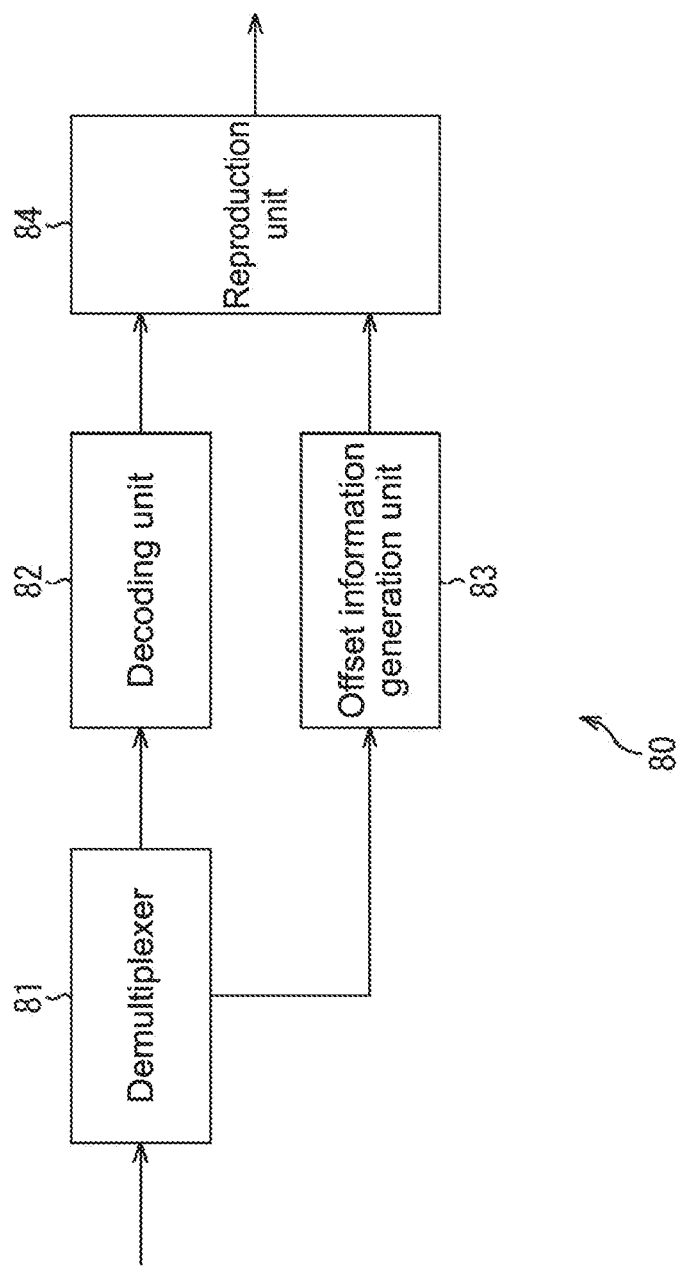
FIG. 18 A block diagram showing a configuration example of a streaming reproduction unit.

FIG. 18 is a block diagram showing a configuration example of a streaming reproduction unit achieved by the movie reproduction terminal 14 in FIG. 1 executing the controlling software 21, the movie reproduction software 22, and the accessing software 23.

A streaming reproduction unit 80 includes a demultiplexer 81, a decoding unit 82, an offset information generation unit 83, and a reproduction unit 84.

In the demultiplexer 81 of the streaming reproduction unit 80, the Fragmented MP4 file to be reproduced is input. This Fragmented MP4 file is acquired from the web server 12 on the basis of a URL of the Fragmented MP4 file to be reproduced, which is acquired by the movie reproduction terminal 14 analyzing the MPD file acquired from the web server 12.

The demultiplexer 81 (extraction unit) extracts the edit list of each medium from the moov box of the Fragmented MP4 file, and supplies it to the offset information generation unit 83. Further, the demultiplexer 81 extracts the encoded stream put in the mdat box of the Fragmented MP4 file, and supplies it to the decoding unit 82.

The decoding unit 82 decodes the encoded stream supplied from the demultiplexer 81, and generates data such as image data and audio data of movie content. The decoding unit 82 supplies the generated data such as image data and audio data to the reproduction unit 84.

The offset information generation unit 83 generates, for each medium, offset information containing Starting offset information and Composition offset information on the basis of the edit list supplied from the demultiplexer 81. Specifically, the offset information generation unit 83 generates, for each medium, offset information with the time represented by the Media Time as the Composition offset on the basis of Non empty edit information in which the Segment Duration is "0" and the Media Time is not "0," which is registered in the edit list.

Further, the offset information generation unit 83 generates, for each medium, offset information with the time represented by the Segment Duration as the Starting offset on the basis of the empty edit information registered in the edit list. Further, the offset information generation unit 83 ignores the edit information in which the Segment Duration is "0" or "0xFFFFFFFF" and the Media Time is "0," which is registered in the edit list. The offset information generation unit 83 supplies the generated offset information of each medium to the reproduction unit 84.

The reproduction unit 84 reproduces (outputs), for each medium, data supplied from the decoding unit 82, on the basis of the offset information supplied from the offset information generation unit 83. Specifically, the reproduction unit 84 reproduces (outputs), for each medium, data from the time later than the start time on the movie time scale by the Starting offset, on the basis of the Starting offset information. Note that the reproduction start position of data is the back position of the top position of the data by the Composition offset represented by the Composition offset information.

The image data and the audio data of the data reproduced by the reproduction unit 84 are respectively supplied to a display unit such as a display (not shown) and a speaker (not shown).

(Description of Processing of Streaming Reproduction Unit)

Figure 19:
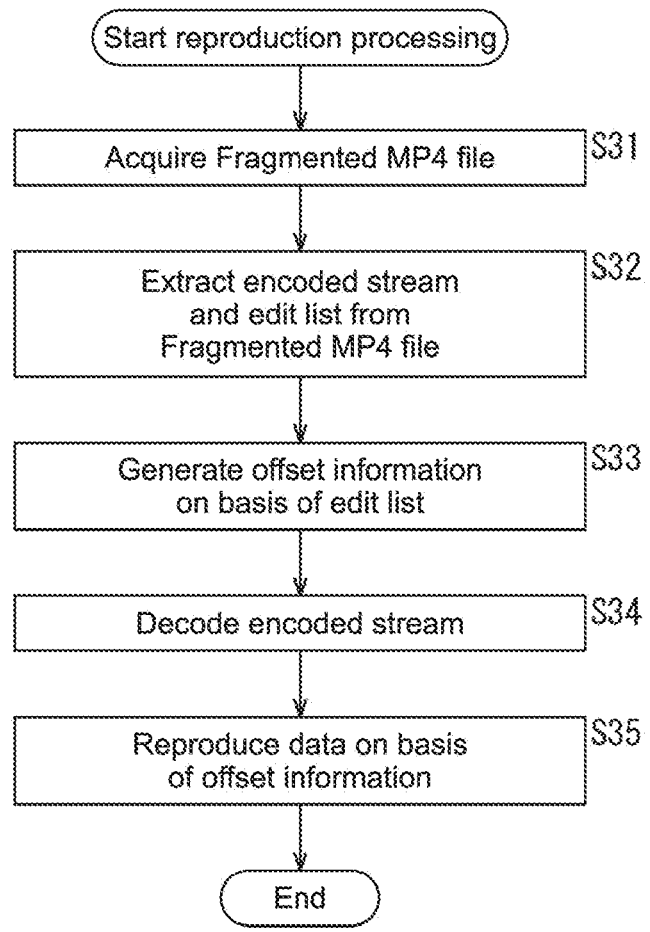
FIG. 19 A flowchart describing reproduction processing performed by the streaming reproduction unit in FIG. 18.

FIG. 19 is a flowchart describing reproduction processing performed by the streaming reproduction unit 80 in FIG. 18.

In Step S31 in FIG. 19, the demultiplexer 81 of the streaming reproduction unit 80 acquires the Fragmented MP4 file to be reproduced from the web server 12. In Step S32, the demultiplexer 81 extracts the encoded stream and the edit list of each medium from the Fragmented MP4 file. The demultiplexer 81 supplies the edit list of each medium to the offset information generation unit 83 and the encoded stream to the decoding unit 82.

In Step S33, the offset information generation unit 83 generates offset information for each medium on the basis of the edit list supplied from the demultiplexer 81, and supplies it to the reproduction unit 84.

In Step S34, the decoding unit 82 decodes the encoded stream supplied from the demultiplexer 81, and generates data such as image data and audio data of movie content. The decoding unit 82 supplies the generated data such as image data and audio data to the reproduction unit 84.

In Step S35, the reproduction unit 84 reproduces, for each medium, the data supplied from the decoding unit 82 on the basis of the offset information supplied from the offset information generation unit 83. Then, the processing is finished.

As described above, the movie reproduction terminal 14 reproduces data from the time later than the reproduction start time on the movie time scale by the Starting offset on the basis of the edit list in the case where a Starting offset is generated.

Second Embodiment (Configuration Example of File Generation Unit according to Second Embodiment of Information Processing System)

The configuration of a second embodiment of the information processing system to which the present disclosure is applied is the same as the configuration of the information processing system 10 in FIG. 1 excluding the file generation unit of the file generation apparatus 11. Therefore, in the following, only the file generation unit will be described.

FIG. 20 is a block diagram showing a configuration example of a file generation unit according to the second embodiment of the information processing system to which the present disclosure is applied.

Of the components shown in FIG. 20, the same components as those shown in FIG. 16 are denoted by the same reference symbols. Overlapping description will be appropriately omitted.

The configuration of a file generation unit 100 in FIG. 20 is different from the configuration of the file generation unit 60 in FIG. 16 in that a demuxer 101 and an edit list generation unit 102 are provided instead of the encoding unit 61 and the edit list generation unit 62. To the file generation unit 100, not data of movie content before encoding but a TS (Transport Stream) file in units of segments in the MPEG2 (Moving Picture Experts Group phase 2) standards, which has been encoded at each encoding rate, is input.

The demuxer 101 of the file generation unit 100 acquires a TS file of each track of movie content. The demuxer 101 extracts a TS from the TS file of each track, and supplies it to the multiplexer 63 as an encoded stream.

Further, the demuxer 101 determines Starting offset information of each track on the basis of the reproduction time and the like contained in the TS file of each track of the movie content. The demuxer 101 determines Composition offset information of each track on the basis of the encoding method and the like of the TS file of each track. The demuxer 101 supplies, for each track, offset information containing the determined Starting offset information and the determined Composition offset to the edit list generation unit 102.

The edit list generation unit 102 generates an edit list on the basis of the offset information supplied from the demuxer 101 similarly to the edit list generation unit 62 in FIG. 16, and supplies it to the multiplexer 63.

As described above, the file generation unit 100 generates a Fragmented MP4 file without re-encoding the TS file of each track of the input movie content.

(Description of Processing of File Generation Unit)

FIG. 21 is a flowchart describing the Fragmented MP4 file generation processing performed by the file generation unit 100 in FIG. 20.

In Step S51 in FIG. 21, the demuxer 101 of the file generation unit 100 acquires a TS file of each track of movie content.

In Step S52, the demuxer 101 extracts a TS from the TS file of each track, and supplies it to the multiplexer 63. In Step S53, the demuxer 101 generates offset information on the basis of the TS file of each track, and supplies it to the edit list generation unit 102.

In Step S54, the edit list generation unit 102 generates an edit list on the basis of the offset information supplied from the demuxer 101, and supplies it to the multiplexer 63.

Because the processing of Steps S55 and S56 is the same as that of Steps S16 and S17 in FIG. 17, description thereof will be omitted.

Third Embodiment (Configuration Example of File Generation Unit according to Third Embodiment of Information Processing System)

The configuration of a third embodiment of the information processing system to which the present disclosure is applied is the same as the configuration of the information processing system 10 in FIG. 1 excluding the file generation unit of the file generation apparatus 11. Therefore, in the following, only the file generation unit will be described.

FIG. 22 is a block diagram showing a configuration example of a file generation unit according to a third embodiment of the information processing system to which the present disclosure is applied.

Of the components shown in FIG. 22, the same components as those shown in FIG. 20 are denoted by the same reference symbols. Overlapping description will be appropriately omitted.

The configuration of a file generation unit 120 in FIG. 22 is different from the configuration of the file generation unit 100 in FIG. 20 in that an edit processing unit 121 is additionally provided and a demuxer 122 is provided instead of the demuxer 101. The file generation unit 120 performs cut editing on the TS file in units of segments in the MPEG2 standards, which has been encoded at each encoding rate, and generates a Fragmented MP4 file.

Specifically, the edit processing unit 121 of the file generation unit 120 acquires the TS file of each track of the movie content. The edit processing unit 121 performs cut editing in which the part in front or behind the movie content is deleted on the basis of user input and the like. Specifically, the edit processing unit 121 generates editing time information that represents the reproduction start time (PTS (Presentation Time Stamp)) and the reproduction end time of the movie content after cut editing. The edit processing unit 121 supplies the TS file of each track and the editing time information to the demuxer 122.

The demuxer 122 extracts, for each track, the TS from the reproduction start time to the reproduction end time represented by the editing time information out of the TSs stored in the TS file supplied from the edit processing unit 121, as the TS after cut editing. At this time, because the time management unit is different for each track, a Starting offset and Composition offset are generated. Therefore, the demuxer 122 generates Starting offset information and Composition offset information of each track, and supplies them to the edit list generation unit 102 as offset information. Further, the demuxer 122 supplies the TS after cur editing to the multiplexer 63 as an encoded stream.

As described above, the file generation unit 120 performs cut editing on the TS file of each track of the input movie content without re-encoding it, and generates the Fragmented MP4 file of the movie content after cut editing.

(Description of Processing of File Generation Unit)

FIG. 23 is a flowchart describing the Fragmented MP4 file generation processing performed by file generation unit 120 in FIG. 22.

In Step S71 in FIG. 23, the edit processing unit 121 of the file generation unit 120 acquires a TS file of each track of movie content. In Step S72, the edit processing unit 121 performs cut editing by generating editing time information on the basis of user input and the like. The edit processing unit 121 supplies the TS file of each track and the editing time information to the demuxer 122.

In Step S73, the demuxer 122 extracts, for each track, the TS after cut editing out of the TSs stored in the TS file supplied from the edit processing unit 121 on the basis of the editing time information. The demuxer 122 supplies the TS after cut editing to the multiplexer 63 as an encoded stream.

In Step S74, the demuxer 122 generates Starting offset information and Composition offset information of each track generated by the cur editing as offset information, and supplies it to the edit list generation unit 102.

Because the processing of Steps S75 to S77 is the same as the processing of Steps S54 to S56 in FIG. 21, description thereof will be omitted.

(Configuration Example of File Generation Unit according to Fourth Embodiment of Information Processing System)

The configuration of a fourth embodiment of the information processing system to which the present disclosure is applied is the same as the configuration of the information processing system 10 in FIG. 1 excluding the file generation unit of the file generation apparatus 11. Therefore, in the following, only the file generation unit will be described.

FIG. 24 is a block diagram showing a configuration example of a file generation unit according to a fourth embodiment of the information processing system to which the present disclosure is applied.

Of the components shown in FIG. 24, the same components as those shown in FIG. 22 are denoted by the same reference symbols. Overlapping description will be appropriately omitted.

The configuration of a file generation unit 140 in FIG. 24 is different from the configuration of the file generation unit 120 in FIG. 22 in that an edit processing unit 141, an edit list generation unit 142, and a multiplexer 143 are provided instead of the edit processing unit 121, the edit list generation unit 102, and the multiplexer 63, and the demuxer 122 is not provided.

To the file generation unit 140, a Fragmented MP4 file of movie content is input. The file generation unit 140 adds, as a reproduction target, a track that is stored in the Fragmented MP4 file and not a reproduction target.

Specifically, the edit processing unit 141 of the file generation unit 140 acquires the Fragmented MP4 file of the movie content, and supplies it to the multiplexer 143. Further, the edit processing unit 141 performs additional editing in which the track that is contained in the Fragmented MP4 file and not a reproduction target is added as a reproduction target on the basis of user input and the like.

Specifically, the edit processing unit 141 generates offset information on the basis of the method of encoding the track added as a reproduction target, the reproduction start time, and the like. The edit processing unit 141 supplies the determined offset information to the edit list generation unit 102.

The edit list generation unit 142 generates an edit list of the track added as a reproduction target on the basis of the offset information supplied from the edit processing unit 141, similarly to the edit list generation unit 62 in FIG. 16, and supplies it to the multiplexer 143.

The multiplexer 143 replaces the edit list of the track added as a reproduction target, which is contained in the moov box of the Fragmented MP4 file supplied from the edit processing unit 141, with the edit list supplied from the edit list generation unit 142. The multiplexer 143 supplies the Fragmented MP4 file in which the edit list has been replaced to the uploading unit 64.

As described above, the file generation unit 140 is capable of performing additional editing without performing re-encoding. Therefore, for example, it is possible to easily generate a Fragmented MP4 file whose reproduction target is tracks of images, audio in English, and audio in Japanese, from the Fragmented MP4 file whose reproduction target is tracks of images and audio in English only.

(Description of Processing of File Generation Unit)

FIG. 25 is a flowchart describing the MP4 file generation processing performed by the file generation unit 140 in FIG. 24.

In Step S91 in FIG. 25, the edit processing unit 141 of the file generation unit 140 acquires a Fragmented MP4 file of movie content, and supplies it to the multiplexer 143. In Step S92, the edit processing unit 141 performs additional editing on the Fragmented MP4 file on the basis of user input and the like, and generates offset information of a track added as a reproduction target. The edit processing unit 141 supplies the determined offset information to the edit list generation unit 102.

In Step S93, the edit list generation unit 142 generates an edit list of the track added as a reproduction target on the basis of the offset information supplied from the edit processing unit 141, and supplies it to the multiplexer 143.

In Step S94, the multiplexer 143 updates the edit list of the track added as a reproduction target, which is contained in the moov box of the Fragmented MP4 file supplied from the edit processing unit 141, with the edit list supplied from the edit list generation unit 142. The multiplexer 143 supplies the resulting Fragmented MP4 file to the uploading unit 64.

In Step S95, the uploading unit 64 uploads the Fragmented MP4 file supplied from the multiplexer 143 to the web server 12 in FIG. 1, and the processing is finished.

Fifth Embodiment (Description of Computer to which Present Disclosure Is Applied)

The series of processing described above can be executed either by hardware or software. When executing the series of processing by software, a program constituting the software is installed in a computer. Here, the computer includes a computer incorporated into dedicated hardware and a computer capable of executing various functions by installing various programs, such as a versatile personal computer.

FIG. 26 is a block diagram showing a configuration example of hardware of a computer that executes the series of processing described above by a program.

In a computer 200, a CPU (Central Processing Unit) 201, a ROM (Read Only Memory) 202, and a RAM (Random Access Memory) 203 are mutually connected by a bus 204.

Also connected to the bus 204 is an input/output interface 205. Connected to the input/output interface 205 are an input unit 206, an output unit 207, a recording unit 208, a communication unit 209, and a drive 210.

The input unit 206 is constituted of a keyboard, a mouse, a microphone, and the like. The output unit 207 is constituted of a display, a speaker, and the like. The recording unit 208 is constituted of a hard disk, a nonvolatile memory, and the like. The communication unit 209 is constituted of a network interface and the like. The drive 210 drives a removable medium 211 such as a magnetic disk, an optical disc, a magneto optical disc, and a semiconductor memory.

In the computer 200 configured as described above, the CPU 201 loads a program stored in the recording section 208 in the RAM 203 via the input/output interface 205 and the bus 204 and executes it to carry out the series of processing described above, for example.

The program executed by the computer 200 (CPU 201) can be recorded onto the removable medium 211 as a package medium, for example, and provided. Moreover, the program can be provided via a wired or wireless transmission medium such as a local area network, the Internet, and digital satellite broadcast.

In the computer 200, by loading the removable medium 211 in the drive 210, the program can be installed in the recording section 208 via the input/output interface 205. The program can also be received by the communication section 209 via a wired or wireless transmission medium and installed in the recording section 208. Alternatively, the program can be installed in advance in the ROM 202 or the recording section 208.

Note that the program to be executed by the computer 200 may be a program in which processing is carried out in time series in the order described in the specification or a program in which processing is carried out in parallel or at necessary timings when invoked, for example.

Furthermore, in the specification, the system refers to a group of a plurality of constituent elements (apparatus, module (component), etc.), and whether or not all constituent elements are provided in the same casing is irrelevant. Therefore, a plurality of apparatuses that are accommodated in different casings and connected via a network and a single apparatus in which a plurality of modules are accommodated in a single casing are both referred to as system.

Note that the effects described in the present disclosure are merely examples and are not limited, and additional effects may be provided.

Further, embodiments of the present technology are not limited to the above-mentioned embodiments and various modifications can be made without departing from the essence of the present technology.

For example, the Media Time constituting dummy edit list information may be a value other than "0" and "0xFFFFFFFF."

It should be noted that the present technology may take the following configurations.

(1)

An information processing apparatus, including:

an edit list generation unit that registers a top position of content as a reproduction start position of the content and a predetermined value as a reproduction time duration of the content in an edit list when a reproduction start time of the content is later than a reproduction start time of the content on a movie time scale, the edit list associating the reproduction start position of the content with the reproduction time duration of the content reproduced from the reproduction start position; and a file generation unit that generates a file in an MP4 Fragmented Movie format, the file containing the edit list generated by the edit list generation unit and the content.

(2)

The information processing apparatus according to (1) above, in which the edit list generation unit is configured to register information that represents nothing is reproduced as the reproduction start position of the content and a difference between the reproduction start time of the content and the reproduction start time on the movie time scale as the reproduction time duration of the content in the edit list when the reproduction start time of the content is later than the reproduction start time on the movie time scale.

(3)

The information processing apparatus according to (1) or (2) above, in which the file generation unit is configured to put the edit list in a moov box of the file.

(4)

The information processing apparatus according to any one of (1) to (3) above, in which the predetermined value is 0.

(5)

The information processing apparatus according to any one of (1) to (3) above, in which all bits of the predetermined value are 1.

(6)

An information processing method, including:

an edit list generation step including, by an information processing apparatus, registering a top position of content as a reproduction start position of the content and a predetermined value as a reproduction time duration of the content in an edit list when a reproduction start time of the content is later than a reproduction start time of the content on a movie time scale, the edit list associating the reproduction start position of the content with the reproduction time duration of the content reproduced from the reproduction start position; and a file generation step including, by the information processing apparatus, generating a file in an MP4 Fragmented Movie format, the file containing the edit list generated by processing of the edit list generation step and the content.

(7)

An information processing apparatus, including:

an extraction unit that extracts an edit list from a file in an MP4 Fragmented Movie format, the file containing the edit list and content, a top position of the content and a predetermined value being respectively registered as a reproduction start position of the content and a reproduction time duration of the content reproduced from the reproduction start position in the edit list when a reproduction start time of the content is later than a reproduction start time of the content on a movie time scale, the edit list associating the reproduction start position of the content with the reproduction time duration of the content; and a reproduction unit that reproduces the content at a time later than the reproduction start time on the movie time scale by a difference between the reproduction start time of the content and the reproduction start time on the movie time scale on the basis of the edit list extracted by the extraction unit when the reproduction start time of the content is later than the reproduction start time of the content on the movie time scale.

(8)

The information processing apparatus according to (7) above, in which information that represents nothing is reproduced and the difference are respectively registered as the reproduction start position of the content and the reproduction time duration of the content in the edit list when the reproduction start time of the content is later than the reproduction start time of the content on the movie time scale.

(9)

The information processing apparatus according to (7) or (8) above, in which the edit list is put in a moov box of the file.

(10)

The information processing apparatus according to any one of (7) to (9), in which the predetermined value is 0.

(11)

The information processing apparatus according to any one of (7) to (9) above, in which all bits of the predetermined value are 1.

(12)

An information processing method, including:

an extraction step including, by an information processing apparatus, extracting an edit list from a file in an MP4 Fragmented Movie format, the file containing the edit list and content, a top position of the content and a predetermined value being respectively registered as a reproduction start position of the content and a reproduction time duration of the content reproduced from the reproduction start position in the edit list when a reproduction start time of the content is later than a reproduction start time of the content on a movie time scale, the edit list associating the reproduction start position of the content with the reproduction time duration of the content; and a reproduction step including, by the information processing apparatus, reproducing the content at a time later than the reproduction start time on the movie time scale by a difference between the reproduction start time of the content and the reproduction start time on the movie time scale on the basis of the edit list extracted by the extraction unit when the reproduction start time of the content is later than the reproduction start time of the content on the movie time scale.

REFERENCE SIGNS LIST 11 file generation apparatus, 14 movie reproduction terminal, 62 edit list generation unit, 63 multiplexer 63, 81 demultiplexer, 84 reproduction unit

The invention claimed is:

1. An information processing apparatus, comprising:
at least one processor configured to:
  generate list information that includes information of a predetermined time and a preset value as a reproduction time of a stream, wherein:
    the list information is generated to start reproduction of content, and
    the reproduction of the content, from beginning of the content, is started after elapse of the predetermined time;
  register information that includes a difference between a reproduction start time of the content and a reproduction start time on a movie time scale as a reproduction time of the content, in the list information;
  wherein the movie time scale corresponds to a timing resolution of the content per second,
  wherein the reproduction start time of the content is later than the reproduction start time on the movie time scale; and
  generate a segment file in an MP4 Fragmented Movie format, wherein a moov box of the segment file includes the generated list information and the stream.

2. The information processing apparatus according to claim 1, wherein:
the information registers that the content is absent in the predetermined time.

3. The information processing apparatus according to claim 1, wherein the preset value is 0.

4. The information processing apparatus according to claim 1,
wherein the preset value is represented in binary form, and
wherein each bit of the preset value is 1.

5. An information processing method, comprising:
in an information processing apparatus:
  generating list information that includes information of a predetermined time and a preset value as a reproduction time of a stream, wherein:
    the list information is generated to start reproduction of content, and
    the reproduction of the content, from beginning of the content, is started after elapse of the predetermined time;
  register information that includes a difference between a reproduction start time of the content and a reproduction start time on a movie time scale as a reproduction time of the content, in the list information;
  wherein the movie time scale corresponds to a timing resolution of the content per second,
  wherein the reproduction start time of the content is later than the reproduction start time on the movie time scale; and
  generating a segment file in an MP4 Fragmented Movie format, wherein a moov box of the segment file includes the generated list information and the stream.

6. An information processing apparatus, comprising:
at least one processor configured to:
  extract list information from a segment file in an MP4 Fragmented Movie format, wherein a moov box of the segment file includes the list information and a stream,
  wherein the list information includes information of a predetermined time and a preset value as a reproduction time of the stream, and
  wherein the list information is generated to reproduce content; and
  reproduce the content, from beginning of the content, at the predetermined time later than a reproduction start time on a movie time scale,
  wherein the movie time scale corresponds to a timing resolution of the content per second, and
  wherein the predetermined time is later by a difference between a reproduction start time of the content and the reproduction start time on the movie time scale, and
  wherein the difference is based on the list information extracted when the reproduction start time of the content is later than the reproduction start time of the content on the movie time scale.

7. The information processing apparatus according to claim 6, wherein
information that represents that the content is absent, and the difference are registered as the predetermined time and the preset value of the content in the list information.

8. The information processing apparatus according to claim 6, wherein the preset value is 0.

9. The information processing apparatus according to claim 6,
wherein the preset value is represented in binary form, and
wherein each bit of the preset value is 1.

10. An information processing method, comprising:
in an information processing apparatus:
  extracting list information from a segment file in an MP4 Fragmented Movie format, wherein a moov box of the segment file includes the list information and a stream,
  wherein the list information includes information of a predetermined time and a preset value as a reproduction time of the stream,
  wherein the list information is generated to reproduce content; and
  reproducing the content, from beginning of the content, at the predetermined time later than a reproduction start time on a movie time scale by a difference between the reproduction start time of the content and the reproduction start time on the movie time scale,
  wherein the movie time scale corresponds to a timing resolution of the content per second, and
  wherein the difference is based on the list information extracted when the reproduction start time of the content is later than the reproduction start time of the content on the movie time scale.

* * * * *